US008943506B2

(12) United States Patent
Tang et al.

(10) Patent No.: US 8,943,506 B2
(45) Date of Patent: Jan. 27, 2015

(54) CLIENT-SIDE VIRTUALIZATION ARCHITECTURE USING DIFFERENTIAL BI-DIRECTIONAL SYNCHRONIZATION AND CLOSED COMPUTING

(75) Inventors: Changbin Tang, Chang Ning District Shanghai (CN); Yanxin Wang, Chang Ning District Shanghai (CN)

(73) Assignee: Transoft (Shanghai), Inc., Shanghai (CN)

( * ) Notice: Subject to any disclaimer, the term of this patent is extended or adjusted under 35 U.S.C. 154(b) by 0 days.

(21) Appl. No.: 13/879,058

(22) PCT Filed: Sep. 29, 2011

(86) PCT No.: PCT/CN2011/080339
§ 371 (c)(1),
(2), (4) Date: Jun. 21, 2013

(87) PCT Pub. No.: WO2012/048619
PCT Pub. Date: Apr. 19, 2012

(65) Prior Publication Data
US 2013/0311990 A1    Nov. 21, 2013

(30) Foreign Application Priority Data

Oct. 12, 2010  (CN) .......................... 2010 1 0505636

(51) Int. Cl.
G06F 9/46       (2006.01)
G06F 9/455      (2006.01)
H04L 29/08      (2006.01)
H04L 29/06      (2006.01)

(52) U.S. Cl.
CPC ........ G06F 9/45533 (2013.01); G06F 9/45558 (2013.01); H04L 67/08 (2013.01); H04L 67/38 (2013.01)

USPC .............................................. 718/100; 718/1

(58) Field of Classification Search
None
See application file for complete search history.

(56) References Cited

U.S. PATENT DOCUMENTS

| 2009/0172781 | A1  |  7/2009 | Masuoka et al. |
|---|---|---|---|
| 2009/0300057 | A1  | 12/2009 | Friedman |
| 2012/0054743 | A1* |  3/2012 | Fujiwara .......................... 718/1 |
| 2012/0284716 | A1* | 11/2012 | Martins et al. ................... 718/1 |
| 2014/0189816 | A1* |  7/2014 | Halperin et al. ................. 726/4 |

FOREIGN PATENT DOCUMENTS

| CN | 101188624 | 5/2008 |
|---|---|---|
| CN | 101448027 | 6/2009 |
| CN | 101754466 | 6/2010 |

* cited by examiner

*Primary Examiner* — Meng An
*Assistant Examiner* — James J Lee
(74) *Attorney, Agent, or Firm* — Occhiuti & Rohlicek LLP

(57) ABSTRACT

The invention discloses the architecture of client-side virtualization, utilizing the techniques of differential bi-directional synchronization of layered data and closed computing, as an extension to virtual desktop infrastructure. Both the client and server run a virtual machine monitor on top of which user application data, system data, personal application, group application, and guest operating system are layered independently. Layer independence is achieved by system data redirection, cache acceleration, and application composing/decomposing method. The client can be securely protected via the push-OS concept, security links, and closed computing services, including virtual machine subscription management control and network resource control services.

14 Claims, 25 Drawing Sheets

CLIENT-SIDE VIRTUALIZATION ARCHITECTURE USING DIFFERENTIAL BI-DIRECTIONAL SYNCHRONIZATION AND CLOSED COMPUTING

CROSS REFERENCE TO RELATED APPLICATION

This application is the national phase under 35 USC 371 of international application no. PCT/CN2011/080339, filed Sep. 29, 2011, which claims the benefit of the priority date of Chinese application no. 201010505636.3 filed Oct. 12, 2010. The contents of the aforementioned applications are incorporated herein in their entirety.

FIELD OF INVENTION

The invention involves the domain of virtualization, specifically the architecture of client-side virtualization using differential synchronization and closed computing.

PRIOR ART

In the past, diskless workstation is a computer with no hard disk to operate remote desktop. The desktop is delivered from an operating system (OS) of a physical server in a remote data center.

The technique of OS virtualization enables multiple OSs running on one physical server, fully utilizes the power of the server, and saves cost of server purchasing. The reason of such virtualization is that multiple "guest" operating systems (or Virtual Machine, or VM, or Guest) runs on top of Virtual Machine Monitor (VMM, or hypervisor), and VMM is running directly on top of physical machine.

Upon the prevalence of virtualization, virtual desktop infrastructure (VDI) is used to replace diskless workstation. Virtual desktop is operated as a remote desktop delivered from the physical server in the data center. It is different from the diskless workstation in that the desktop is from a virtual machine, not the OS running on the physical machine. The client of virtual desktop uses a small box, called thin client, with small memory, to provide functions of communication and display.

Since users have a need to operate when line is disconnected, "Offline VDI" (different from "client-side virtualization") starts emerging. This technique installs a VMM at the client-side, thus VM image as well as mandatory applications (abbrev. as "app" hereafter) are streamed from server and users are able to operate when line is disconnected. A reconnection after the disconnected operation enables both user and administrator of data center to synchronize the change of data, application, and OS to keep content consistency. The above disconnect-reconnect steps can be repeated.

Around 2009, US companies MICROSOFT, VMWARE, and CITRIX all released an initial version of offline VDI. US companies such as MOKA5 earlier also released an offline VDI product that took advantage of VMWARE's free client product WORKSTATION. MOKA5 product is based on the result of a research project "Collective" from US STANFORD UNIVERSITY, emphasizing the utilization of cache to resolve the latency problem of image delivery. This technique however does not use differential to reduce the size of content delivered. "Differential" here is defined as the difference of images between the client and server since last synchronization. This greatly reduces the amount of data transferred on the network. Furthermore, since VMWARE product is not open source, MOKA5 cannot take advantage of the homogeneity of VM (e.g. all VMs are Windows or all are Linux) to reduce the application/VM image storage for large-size users.

The differential synchronization algorithm has been around for long time, e.g. open source ideas such as rsync and unisom. However, the algorithm has not been widely used in the field of offline VDI. In other words, the technique to calculate and compare hash value for blocks of file differential is pretty generic, but comparing the hash value amongst client/server (or slave/master) parties, all in VMM environment, is first seen in U.S. Pat. No. 7,447,852 to Cannon, et al. "Tracking and replicating changes to a virtual disk", December 2005.

Offline VDI uses layering method. However, those applications tightly-coupled with OS during deployment and runtime are often influenced by system registry and other OS files, hence the layering (or isolating application from OS) is difficult. In order to isolate an application from its OS, there is a handy technology used in the field of application virtualization, also called application virtualization engine (or briefly "AVE", such as MICROSOFT APP-V, TRANSOFT TRANSOD, CITRIX XEN-APP, VMWARE THINSTALL, etc.). There are normally three parts of this technology: (a) a pre-processor decomposes the original application from its OS information, (b) a delivering method to send the packaged app+OS info from a server to AVE client, and (c) the AVE client to re-compose the received package and run the application on top of the AVE client platform. The decomposing function in (a) and composing functions in (c) become a must in order to layer the images of application and OS properly.

Further, the feature of offline VDI cannot be used in many lines of business. For example, schools and government agencies require security at the hardware level, which cannot be satisfied by offline VDI. In cyber café, the technique of "reverting card" for PC currently cannot be replaced by offline VDI. Further, the training centers have a requirement for their workstations to swap OS environments often. This cannot be satisfied either. Therefore, the methods of offline VDI do not resolve deeper problems. The invention of client-side virtualization is able to provide solutions for the above deficiencies in various lines of business applications.

SUMMARY OF INVENTION

The purpose of the invention is to disclose a method of Client-Side Virtualization (CSV), called CSV differential synchronization and closed computing. Specifically it involves solutions to deeper CSV problems based on differential synchronization. The solutions include the following functions, to be realized with client/server technique:

Function 1, differential synchronization;
Function 2, cache acceleration;
Function 3, closed computing;
Function 4, the way to place the individual user system data into a state to be differential synchronized via redirection;
Function 5, the way to isolate an application from OS, and to extract the parts that are able to be differential-synchronized;
Function 6, hoteling guest OS;
Function 7, push-OS;
Function 8, VM subscription management control and network resource control;
Function 9, client-side closed computing services, and four (4) secure links.

In order to realize the above functions, the invention uses client-side virtualization which includes:

The client is one or more computers, which can be desktops, laptops, netbooks, and even removable storage (e.g. USB storage), to communicate with servers in the data center via network. The servers in the data center contain one or more server computers, a.k.a hosts. If more than one hosts then they are operated in clusters. Any server host of a cluster is installed with virtualization software VMM, on top of which one or more VM is running.

The client computer also runs VMM. The VMM may be pre-installed, or delivered at power-up. Whatever the way it is, the client OS must be delivered from the server at system initialization to run. Actually, the OS delivered to client also includes one or more applications running on top of the OS. The application may be virtualized to package together with the OS for delivery. Such a package is called golden image.

Consequently, if the system starts running, user app data, system data, newly-added or upgraded application, even swapped VM, are bi-directional, differential-synchronized between client and server. The user is able to operate offline, but the changes made during offline are synchronized upon reconnection.

If the client is a removable storage, a VMM is still in it. This removable storage may be downloaded in a school or office environment with data, application, and golden image, and is plugged into a third-party computer (e.g. a home computer). The computer then loads the whole running environment and conducts offline job.

The CSV architecture of the invention provides a method of CSV, which is built upon client/server architecture. When the user is online, the client constantly synchronizes the data, application and OS with the server. Additionally, user operations are protected with security mechanisms, preventing hacker attack. Such a system extends the VDI technology, and also has many specific business applications. For example, CSV becomes an eSchoolbag for education communities, an eBriefcase for enterprises or government agencies (the terminology "eBag" is used hereafter as a generalization for eSchoolbag and eBriefcase), a desktop with reverting function in cyber cafés, and a workstation that swaps amongst many OSs for training centers.

BRIEF DESCRIPTION OF DRAWINGS

The most objective way to explain the embodiments of the invention is to use the following diagrams, either in the format of block diagram or flow chart. For those skilled in the art, it is obvious from the detailed description of the preferred embodiments, referenced by the following diagrams, to understand the purposes, characteristics and advantages of the invention.

DETAILED DESCRIPTION OF THE PREFERRED EMBODIMENTS

CSV Architecture

Figure 1:
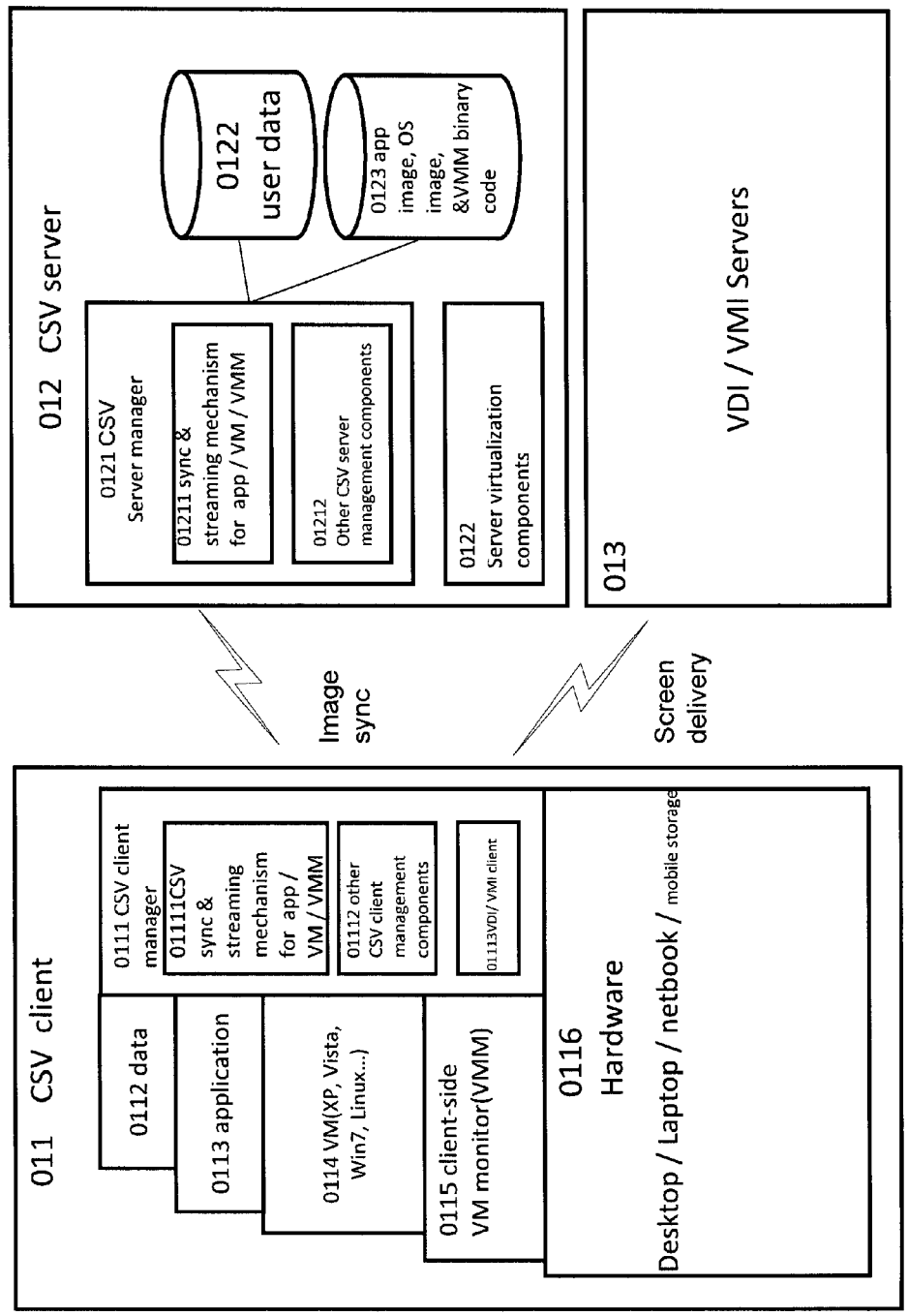
FIG. 1 is the CSV architecture block diagram of an embodiment based on this invention.

FIG. 1 is the CSV architecture block diagram of an embodiment based on the invention. The CSV architecture includes client system (CSV client) 011, server system (CSV server) 012, the combined VDI (Virtual Desktop Infrastructure) and VMI (Virtual Mobile Infrastructure) server 013. The communication between CSV client 011 and CSV server 012 is bi-directional image synchronization; but at the CSV client VDI/VMI clients can also be installed. These clients acquire VM screen from the VDI/VMI combined server, and send behavior of keyboard and mouse back to the VDI/VMI server. The meaning of VDI has been described in the prior art. As for VMI, it is a technology to virtualize the cellphone operating system, run the virtualized OS on top of the VMI server, and deliver cellphone screen to the mobile client. The details of VMI technology is disclosed in Chinese patent application CN200810204286.X.

In the system shown in FIG. 1, CSV client manager 0111 handles the following data: user data 0112, application image 0113, VM image 0114, and VMM 0115. As to hardware 0116, it can be a desktop, laptop, netbook, or removable storage. CSV client manager itself contains the most important components: the mechanism of synchronization and streaming 01111, which synchronizes the image between CSV client and CSV server; other CSV client component 01112 such as repository system, cache system, and security system; VDI/VMI client 01113 communicates with VDI/VMI server via screen delivery technology.

CSV server 012 includes CSV server manager 0121, user database 0122, application image, OS image, VMM binary code 0123, and server virtualization component 0122. CSV server manager 0121 further includes the most important mechanism of server synchronization and streaming 01211, as well as other CSV server management components 01212.

Figure 2:
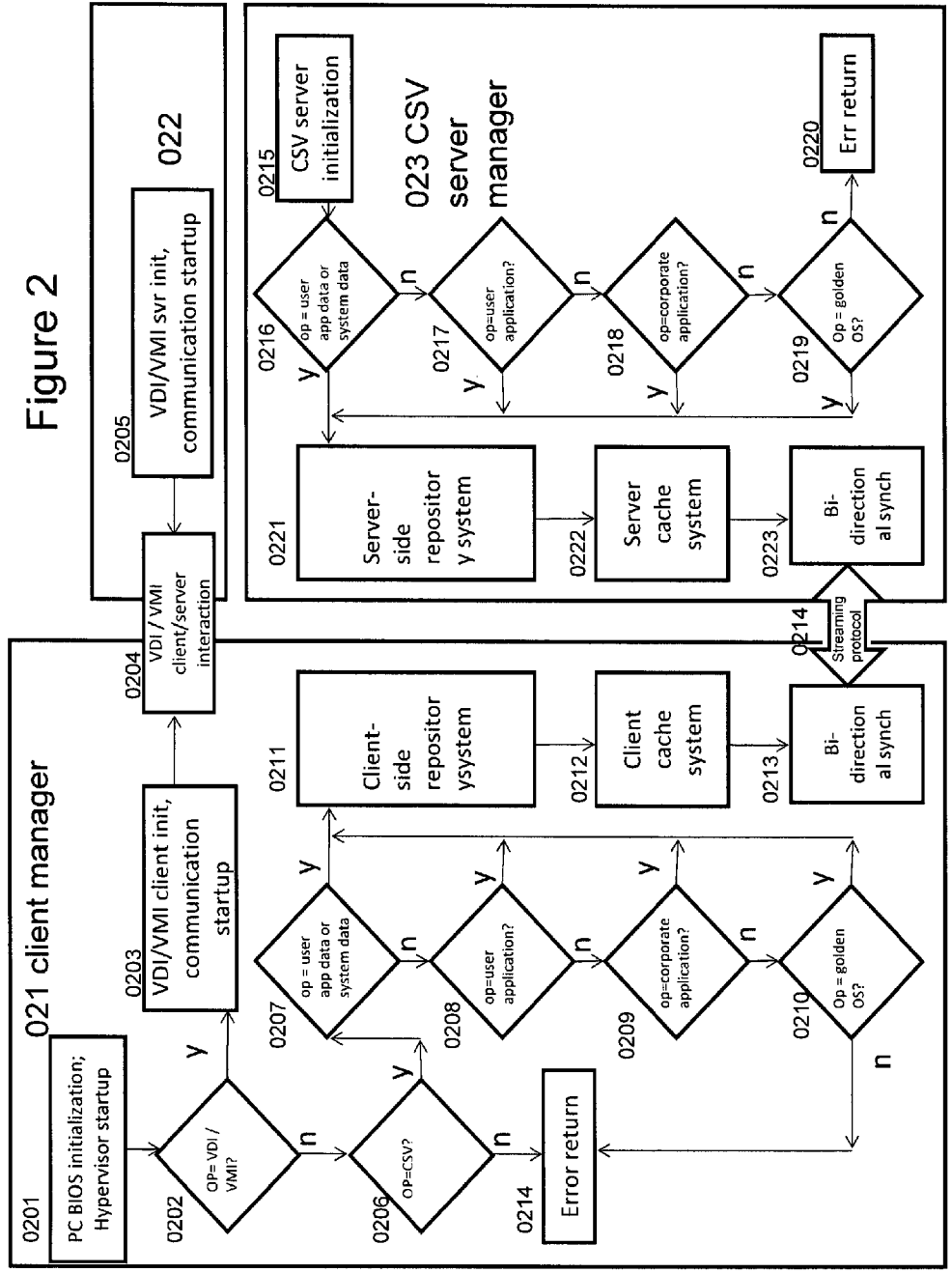
FIG. 2 is a combined block diagram and flowchart of an embodiment based on this invention, for CSV architecture "client/server layered data processing", explaining client manager 0111 and server manager 0121 of FIG. 1.

The embodiment of FIG. 2 also explains the interaction between CSV client and CSV server is based on synchronization and streaming technology. The above introduction covers CSV architecture.

CSV Client/Server Layered Data Processing

FIG. 2 gives a combined block diagram and flowchart of CSV client 011/CSV server 012 to process layered data. The block 021 on the left is the block diagram of client manager. The block 022 on the right is VDI/VMI server manager. The block 023 at the lower right is the CSV server manager, which is paired with the block of client manager on the left. The architecture of "layered data processing" is a design option. Layered data processing is originated from VDI which uses thin clients. The purpose is for IT personnel of different corporate departments to manage, say, user application data, user system data, cache data, personal application data, corporate application data, and OS image data. CSV architecture also uses layering, but in a way different from VDI, namely, the layered data between client and server synchronizes bi-directionally with streaming technique for communication. Note that the deployment of application on client or server is not though network communication. Rather, it is simply a faster procedure call or system call at the local host. Furthermore, user system data may be redirected at file-saving time into a synchronization area, and can be backed up. The step 0503 of FIG. 5A explains this. CSV client/server layered data processing comprises:

Step 0201, begin PC BIOS initialization and VMM hypervisor startup;

Step 0202, determine is the operation is VDI/VMI. If yes, go to step 0203, otherwise go to step 0206;

Step 0203, VDI/VMI client initializes and communication starts up. Go to step 0204;

Step 0204, VDI/VMI client/server interaction; Step 0205, VDI/VMI server initializes and communication starts up. Go to step 0204;

Step 0206, determine if the operation is CSV. If yes, go to step 0207. Otherwise, go to step 0214;

Step 0207, determine if the operation is user application data or user system data. If yes, go to step 0211, execute those data redirected, and use backup at disaster recovery. Otherwise, go to step 0208;

Step 0208, determine if the operation is user application. If yes, go to step 0211. Otherwise, go to step 0209;

Step 0209, determine if the operation is company application. If yes, go to step 0211. Otherwise, go to step 0210;

Step 0210, determine if the operation is golden OS. If yes, go to step 0211. Otherwise, go to step 0214;

Step 0211, execute various functions of client-side repository system, and go to step 0212;

Step 0212, execute various functions of client-side cache system, and go to step 0213;

Step 0213, execute client-side bi-directional synchronization, and go to step 0214;

Step 0214, execute streaming protocol, and go to step 0213 or step 0223;

Step 0215, CSV server initializes. Go to step 0215;

Step 0216, determine if the operation is user application data or user system data. If yes, go to step 0221, execute those data redirected, and use backup at disaster recovery. Otherwise, go to step 0217;

Step 0217, determine if the operation is user application. If yes, go to step 0221. Otherwise, go to step 0218;

Step 0218, determine if the operation is company application. If yes, go to step 0221. Otherwise, go to step 0219;

Step 0219, determine if the operation is golden OS. If yes, go to step 0221. Otherwise, go to step 0220;

Step 0220, return with error;

Step 0221, execute various functions of server-side repository system, and go to step 0212;

Step 0222, execute various functions of server-side cache system, and go to step 0223;

Step 0223, perform server-side bi-directional synchronization, and go to step 0224.

Client Initialization/BIOS

Figure 3:
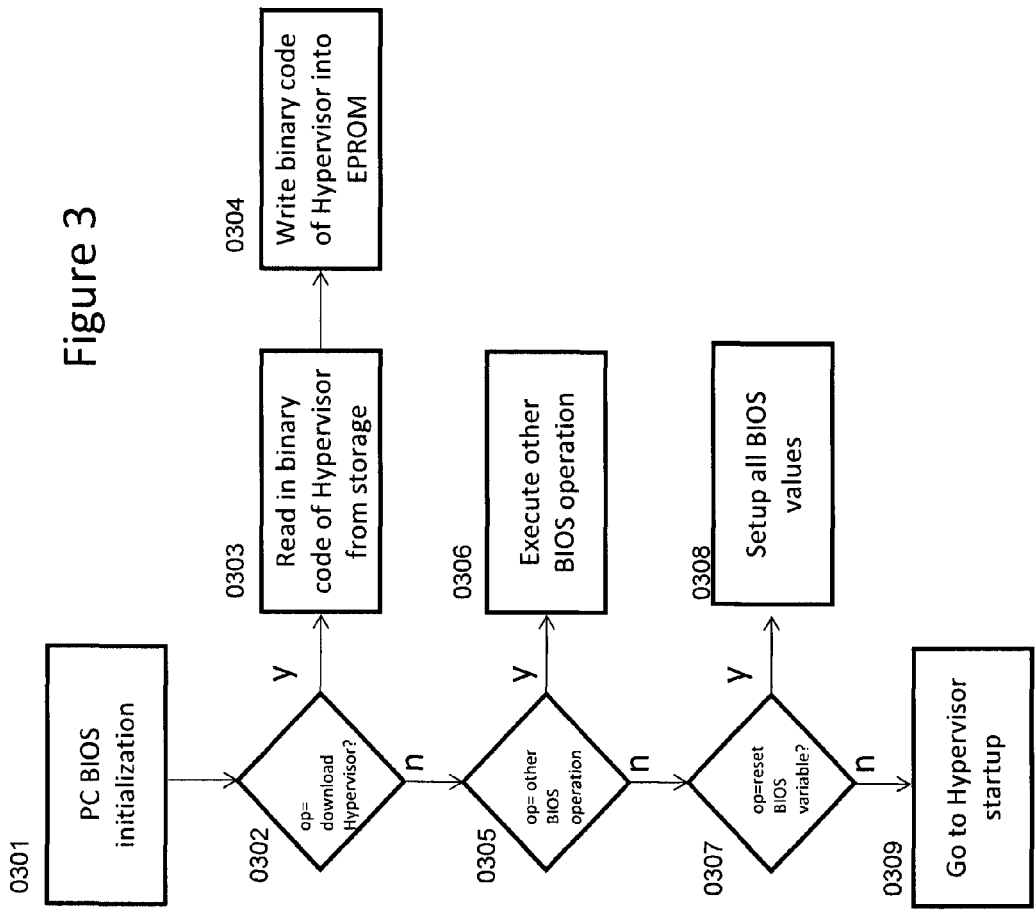
FIG. 3 is a flowchart of an embodiment based on this invention, for CSV architecture "client powerup/BIOS", explaining step 0201 of FIG. 2.

FIG. 3 is the flowchart of client startup/BIOS. Before client starts up OS, it uses BIOS to download hypervisor. The workflow comprises:

Step 0301, carry out PC BIOS initialization and VMM/hypervisor startup;

Step 0302, determine if the operation is to download hypervisor. If yes, go to step 0303. Otherwise, go to step 0305;

Step 0303, read the hypervisor binary code from peripheral media. Go to step 0304;

Step 0304, write hypervisor binary code into EPROM;

Step 0305, determine if the operation is other BIOS operation. If yes, go to step 0306. Otherwise, go to step 0307;

Step 0306, execute other BIOS operation;

Step 0307, determine if the operation is reset BIOS variable. If yes, go to step 0308. Otherwise, go to step 0309;

Step 0308, set all BIOS value;

Step 0309, enter hypervisor startup.

Bare Machine Hypervisor Startup

Figure 4:
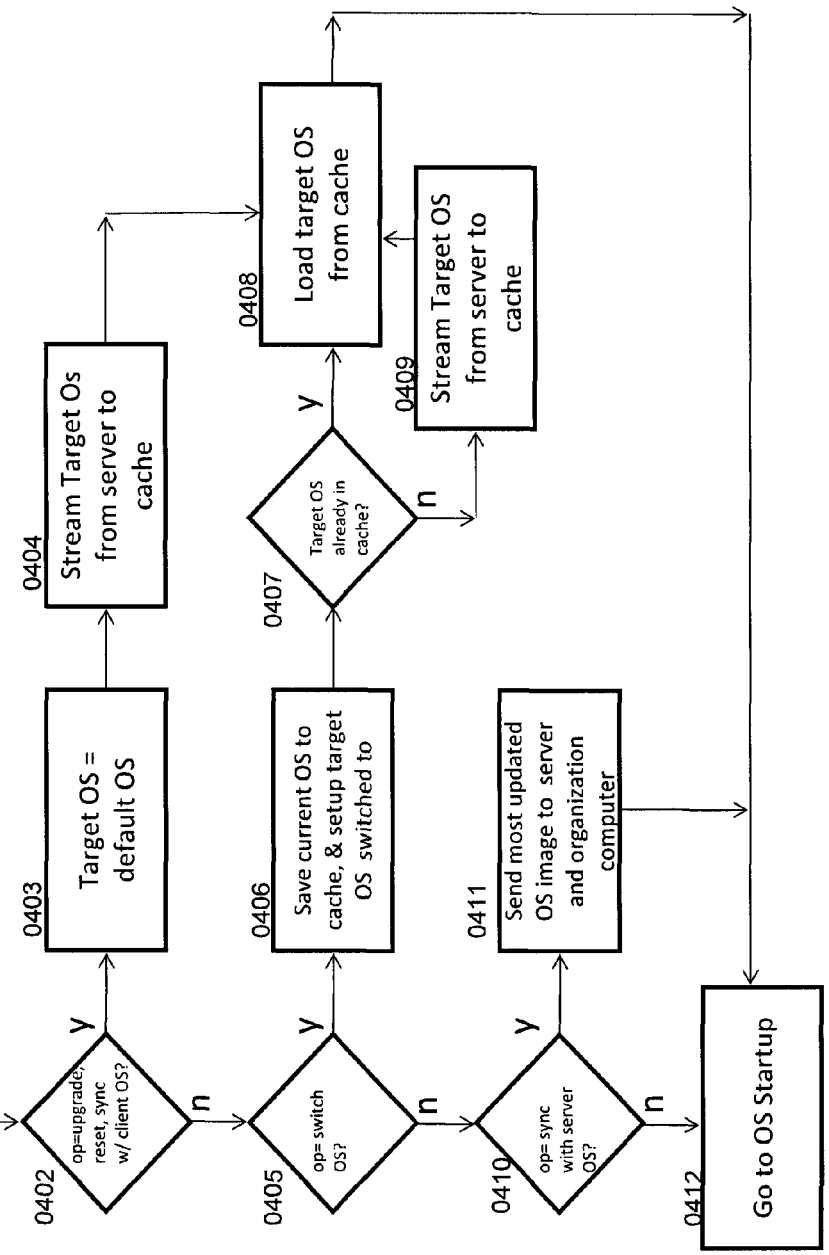
FIG. 4 is a flowchart of an embodiment based on this invention for CSV architecture "Bare-machine hypervisor startup", explaining step 0309 of FIG. 3.

FIG. 4 is the flowchart of bare-machine hypervisor startup, which is how a hypervisor manages the logic of guest OS running on it, including OS upgrading, resetting, switching, and synchronizing. Synchronizing may be "downward", meaning synchronizing the client OS to become completely the same as the user VM on the server; "upward" synchronizing means synchronizing the user VM on the server to become completely the same as the client OS.

In FIG. 4, bare machine must have storage for caching (except USB e-briefcase or e-schoolbag). Cached OS is always the most-updated version. And e-briefcase & e-schoolbag are examples of bare machine.

The Workflow Comprises:

Step 0401, hypervisor (bare-machine) starts up. Go to step 0402;

Step 0402, determine if the operation is upgrading, resetting, and downward synchronizing the OS. If yes, go to step 0403. Otherwise, go to step 0405;

Step 0403, read hypervisor binary code from peripheral media. Go to step 0404;

Step 0404, designate the target OS as "default OS". Go to step 0408;

Step 0405, determine if the operation is switching OS. If yes, go to step 0406. Otherwise, go to step 0410;

Step 0406, save current OS to cache, and setup target OS switched to. Go to step 0407;

Step 0407, determine if the target OS is already in cache. If yes, go to step 0408. Otherwise, go to step 0409;

Step 0408, load target OS from cache. Go to step 0412;

Step 0409, target OS is streamed from server to cache. Go to step 0408;

Step 0410, determine if the operation synchronizing OS upward. If yes, go to step 0411. Otherwise, go to step 0412;

Step 0411, send most updated OS image to server and organization computer. Go to step 0412;

Step 0412, enter OS startup.

Repository System

Figure 5A:
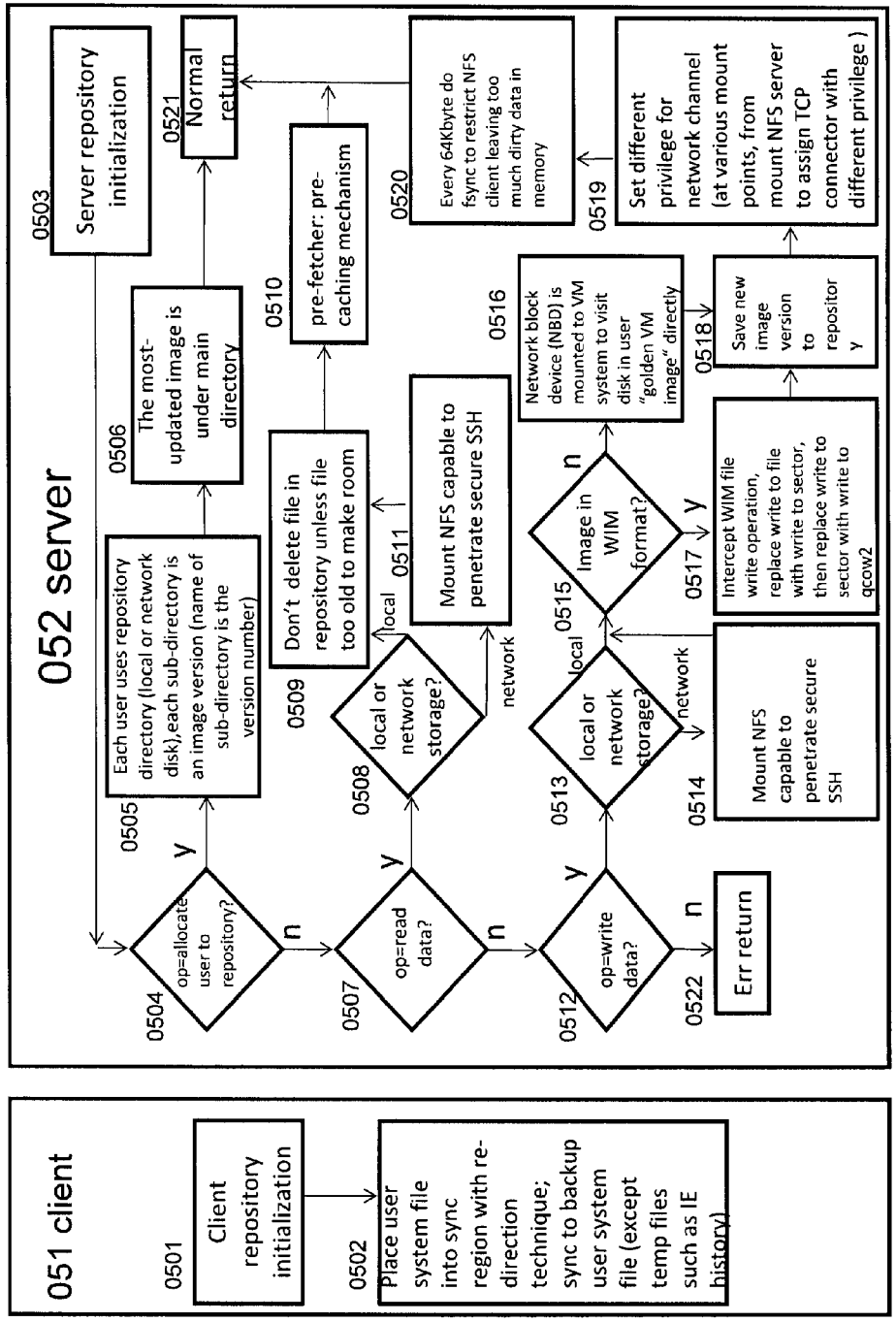
FIG. 5A is a flowchart of an embodiment based on this invention for CSV architecture "repository system", explaining step 0211 of FIG. 2.

FIG. 5A is a combined block diagram and flowchart of repository system. Block 051 is the flowchart of client file system, which redirects user system files. If these system files are not temporary files, they are synchronized to the server for backup purpose. Block 052 is the server repository system, using NFS file system in this embodiment. When the server reads data, the cache pre-fetch mechanism is used; when writing data, the server builds different privilege at different mount point for different network channel. From the mounted NFS, the server provides TCP connector with different privilege.

The workflow of client file system 051 comprises:

Step 0501, client-side repository system initializes. Go to step 0502;

Step 0502, place user system file into sync area with re-direction technique; synchronize to backup user system file (except temporary files such as IE history);

The workflow of server file system 052 comprises:

Step 0503, server-side repository system initializes. Go to step 0504;

Step 0504, determine if the operation is allocating users to the repository. If yes, go to step 0505. Otherwise, go to step 0507;

Step 0505, each user uses repository directory (local or network disk), each sub-directory is an image version (name of sub-directory is the version number). Go to step 0506;

Step 0506, the most-updated image is under main directory. Go to step 0521;

Step 0507, determine if the operation is reading data. If yes, go to step 0508. Otherwise, go to step 0512;

Step 0508, determine if local or network storage. If local, go to step 0509. Otherwise, go to step 0511;

Step 0509, don't delete file in repository unless file too old to make room. Go to step 0510;

Step 0510, execute pre-fetch mechanism. Go to step 0518;

Step 0511, Mount NFS capable to penetrate secure SSH. Go to step 0509;

Step 0512, determine if the operation is writing data. If yes, go to step 0513. Otherwise, go to step 0522;

Step 0508, determine if local or network storage. If network storage, go to step 0515. Otherwise, go to step 0514;

Step 0514, Mount NFS capable to penetrate secure SSH. Go to step 0514;

Step 0515, determine if image is in WIM format. If yes, go to step 0517. Otherwise, go to step 0516;

Step 0516, network block device (NBD) is mounted to VM system to visit disk in user "golden VM image" directly. Go to step 0518;

Step 0517, intercept WIM file write operation, replace write to file with write to sector, then replace write to sector with write to qcow2. Go to step 0518;

Step 0518, save new image version to repository. Go to step 0519;

Step 0519, set different privilege for network channel (at various mount points, from mount NFS server to assign TCP connector with different privilege). Go to step 0520;

Step 0520, do fsync each 64 Kbyte to minimize dirty data residing in the memory of NFS client. Go to step 0521;

Step 0521, return normally;

Step 0522, return with error.

Distributed Repository System

Figure 5B:
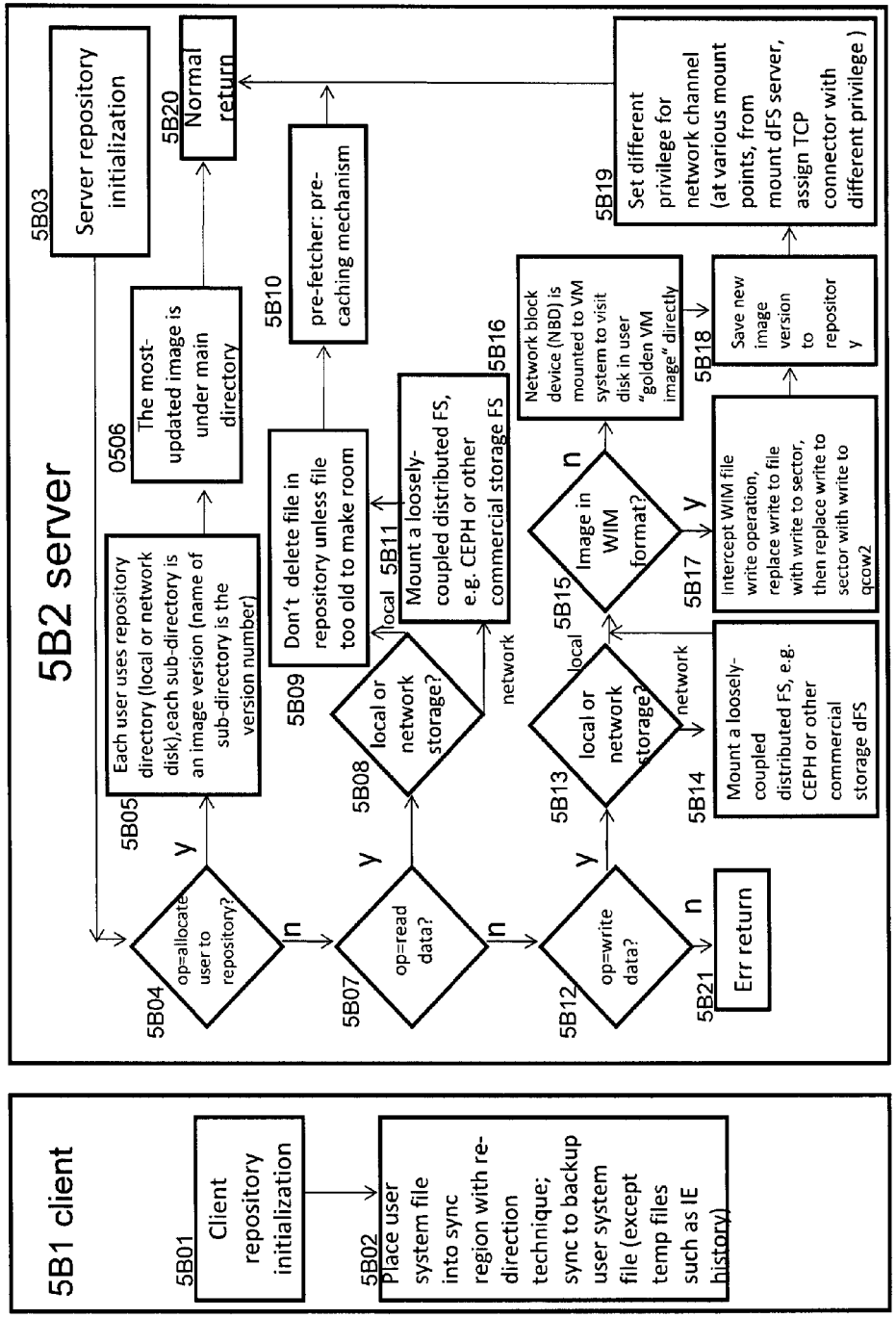
FIG. 5B is a flowchart of an embodiment based on this invention for CSV architecture "distributed repository system", explaining step 0211 of FIG. 2.

FIG. 5B is a combined block diagram and flowchart of distributed repository system. This is similar to FIG. 5B, but the embodiment is applied to a distributed environment, which provides a more stateful, scalable and reliable file service than NFS can provide. Block 5B1 is the flowchart of client file system, which redirects user system files. If these system files are not temporary files, they are synchronized to the server for backup purpose. Block 5B2 is the server repository system, which may be local or a remote distributed file system (dFS). When the server reads data, the cache pre-fetch mechanism is used; when writing data, the server builds different privilege at different mount point for different network channel. From the mounted dFS, the server provides TCP connector with different privilege. The synchronization between local disk and distributed file system is further explained in the illustration of FIG. 23.

The workflow of client file system 5B1 comprises:

Step 5B01, client-side repository system initializes. Go to step 5B02;

Step 5B02, place user system file into sync area with re-direction technique; synchronize to backup user system file (except temporary files such as IE history);

The workflow of server file system 5B2 comprises:

Step 5B03, server-side repository system initializes. Go to step 5B04;

Step 5B04, determine if the operation is allocating users to the repository. If yes, go to step 5B05. Otherwise, go to step 5B07;

Step 5B05, each user uses repository directory (local or network disk), each sub-directory is an image version (name of sub-directory is the version number). Go to step 5B06;

Step 5B06, the most-updated image is under main directory. Go to step 5B21;

Step 5B07, determine if the operation is reading data. If yes, go to step 5B08. Otherwise, go to step 5B12;

Step 5B08, determine if local or network storage. If local, go to step 5B09. Otherwise, go to step 5B11;

Step 5B09, don't delete file in repository unless file too old to make room. Go to step 5B10;

Step 5B10, execute pre-fetch mechanism. Go to step 5B18;

Step 5B11, mount a loosely-coupled distributed File System (dFS), such as CEPH or other commercial storage FS. Go to step 5B09;

Step 5B12, determine if the operation is writing data. If yes, go to step 5B13. Otherwise, go to step 5B21;

Step 5B08, determine if local or network storage. If network storage, go to step 5B15. Otherwise, go to step 5B14;

Step 5B14, mount a loosely-coupled distributed File System (dFS), such as CEPH or other commercial storage FS. Go to step 5B14;

Step 5B15, determine if image is in WIM format. If yes, go to step 5B17. Otherwise, go to step 5B16;

Step 5B16, network block device (NBD) is mounted to VM system to visit disk in user "golden VM image" directly. Go to step 5B18;

Step 5B17, intercept WIM file write operation, replace write to file with write to sector, then replace write to sector with write to qcow2. Go to step 5B18;

Step 5B18, save new image version to repository. Go to step 5B20;

Step 5B19, set different privilege for network channel (at various mount points, from mounted dFS server, assign TCP connector with different privilege). Go to step 5B20;

Step 5B20, return normally;

Step 5821, return with error.

Cache System

Figure 6:
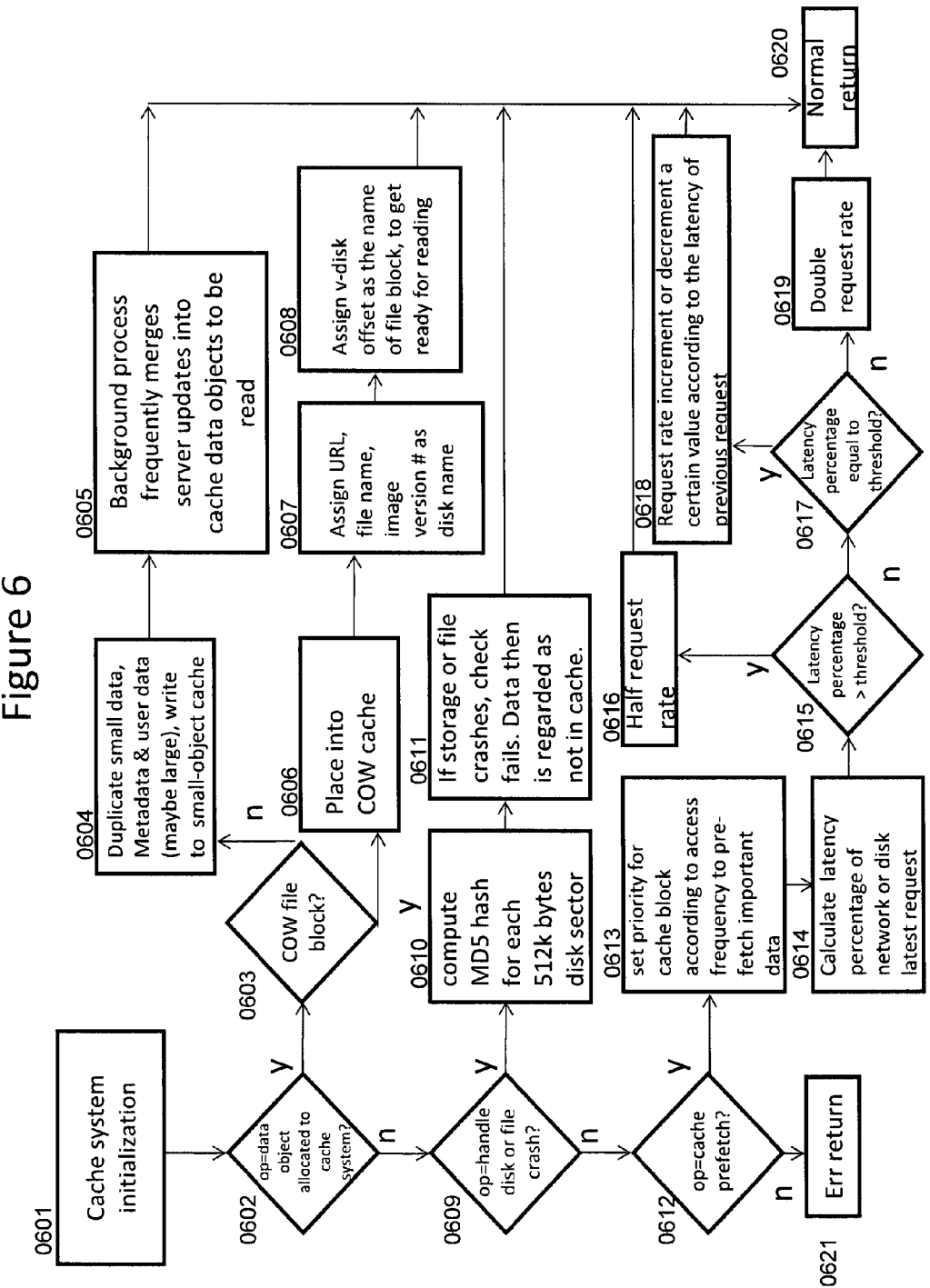
FIG. 6 is a flowchart of an embodiment based on this invention for CSV architecture "cache system", explaining step 0212 of FIG. 2.

FIG. 6 is the flowchart of cache system. Cache system facilitates the allocation of data objects into cache and handles storage or file crash problem. The pre-fetching mechanism of the cache system sets the priority of cache file blocks according to the access rate, such that important data may be pre-fetched first. If the latency percentage is over a set threshold, reduce the access rate; if the latency percentage is smaller than the threshold, increase the access rate; if latency percentage is equal to the threshold, the access rate increases or decreases up to the latency of previous request. The workflow comprises:

Step 0601, initialize the cache system. Go to step 0602;

Step 0602, determine if the operation is to allocate data objects into the cache system. If yes, go to step 0603. Otherwise, go to step 0609;

Step 0603, determine if the operation is COW file block. If yes, go to step 0604. Otherwise, go to step 0606;

Step 0604, duplicate small data, metadata & user data (maybe large), and write to small-object cache. Go to step 0605;

Step 0605, background process frequently merges server updates into cache data objects to be read. Go to step 0620;

Step 0606, place into COW cache. Go to step 0607;

Step 0607, assign URL, file name, image version # as disk name. Go to step 0608;

Step 0608, assign v-disk offset as the name of file block, to get ready for reading. Go to step 0620;

Step 0609, determine if the operation is to handle disk crash and file crash. If yes, go to step 0610. Otherwise, go to step 0611;

Step 0610, compute MD5 hash values for each disk sector in size of 512 k bytes. Go to step 0612;

Step 0611, if storage (or file) crashes the checking fails. Data is then regarded as not in cache. Go to step 0620;

Step 0612, determine if the operation cache pre-fetch. If yes, go to step 0613. Otherwise, go to step 0621;

Step 0613, set priority for cache block according to access frequency to pre-fetch important data. Go to step 0614;

Step 0614, calculate latency percentage of network or disk latest request. Go to step 0615;

Step 0615, determine if latency percentage>threshold. If yes, go to step 0616. Otherwise, go to step 0617.

Step 0616, decrease the request rate by half. Go to step 0620;

Step 0617, determine if latency percentage equal to threshold. If yes, go to step 0618. Otherwise, go to step 0619.

Step 0618, request rate incrementing or decrementing a certain value according to the latency of previous request. Go to step 0620;

Step 0619, double request rate; and go to step 0620;

Step 0620, return normally;

Step 0621, return with error.

By-Directional Synchronization

Figure 7:
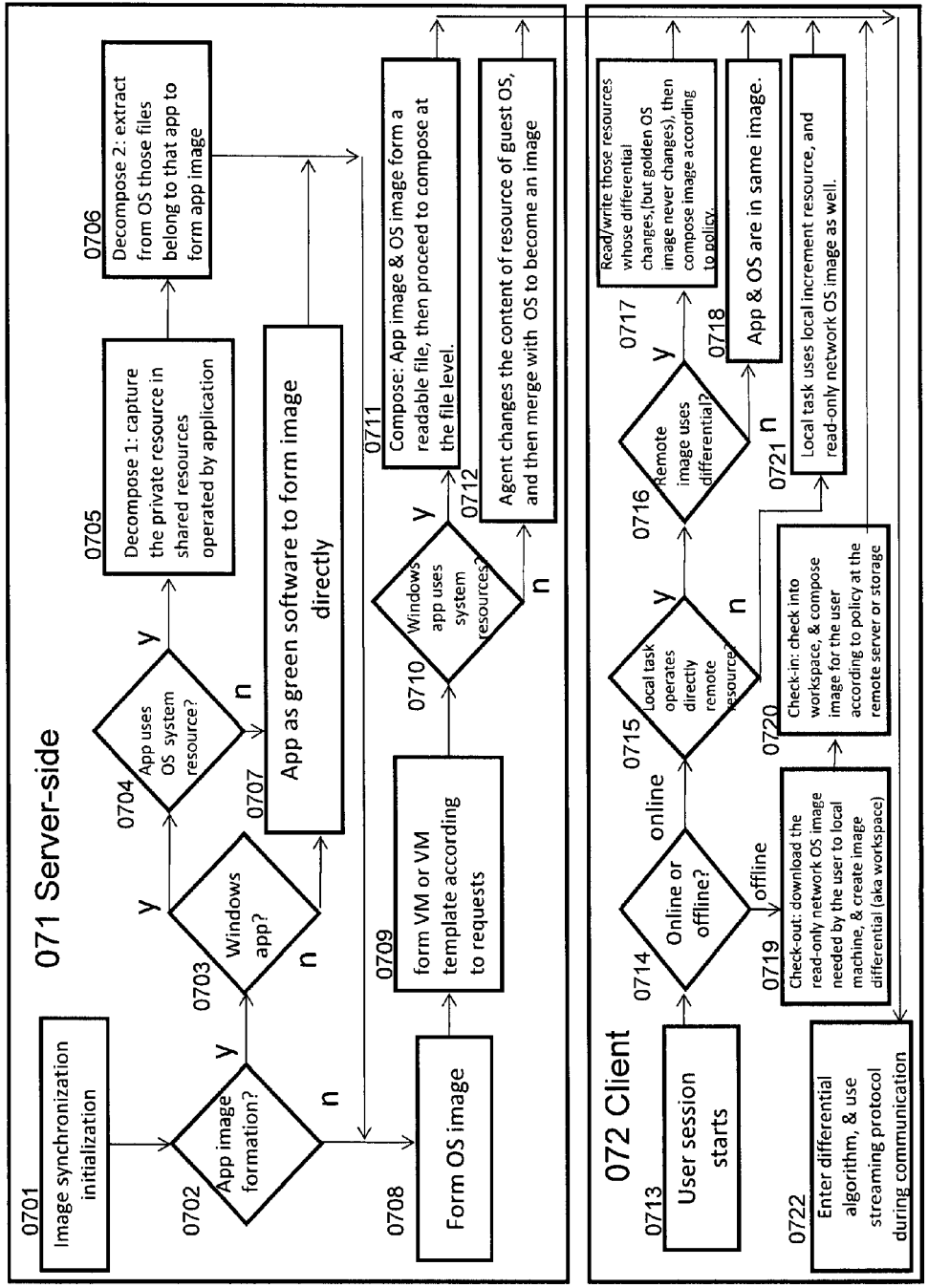
FIG. 7 is a flowchart of an embodiment based on this invention for CSC architecture "bi-directional synchronization", explaining step 0213 of FIG. 2.

FIG. 7 is a combined block diagram and flowchart of by-directional synchronization. Block 071 contains steps for server to prepare application image and OS image. Block 072 contains the steps after user session starts. These steps need to process the differential after the golden image is generated (in FIG. 8). When differential is processed, the streaming protocol is used to communicate between client and server.

The workflow of server 071 comprises:

Step 0701, image synchronization initializes. Go to step 0702;

Step 0702, determine if the operation is to form application image. If yes, go to step 0703. Otherwise, go to step 0708;

Step 0703, determine if the application is a Windows application. If yes, go to step 0704. Otherwise, go to step 0707;

Step 0704, determine if the application uses system resource. If yes, go to step 0705. Otherwise, go to step 0707;

Step 0705, the first decomposition step: capture the private resource in shared resources operated by application. Go to step 0706;

Step 0706, the second decomposition step: extract from OS those files belong to that application to form application image. Go to step 0714;

Step 0707, application image is formed directly if it is green software. Go to step 0708;

Step 0708, generate OS image. Go to step 0709;

Step 0709, form a VM or VM template according to request. Go to step 0710;

Step 0710, determine if operating the Windows application uses system resource. If yes, go to step 0711. Otherwise, go to step 0712;

Step 0711, composition: Application image & OS image form a readable file, then proceed to compose at the file level, and go to step 0722;

Step 0712, Agent changes the content of resource of guest OS, and then merge with OS to become an image. Go to step 0722;

The workflow of client 072 comprises:

Step 0713, user session starts. Go to step 0714;

Step 0714, determine if the operation is online or offline. If online, go to step 0715. Otherwise, go to step 0719;

Step 0715, determine if the operation is local task directly operates remote network resources. If yes, go to step 0716. Otherwise, go to step 0721;

Step 0716, determine if remote image uses differential. If yes, go to step 0717. Otherwise, go to step 0718;

Step 0717, read/write those resources whose differential changes, (but golden OS image never changes), then compose image according to policy. Go to step 0722;

Step 0718, application & OS are in same image. Go to step 0722;

Step 0719, Check-out: download the read-only network OS image needed by the user to local machine, & create image differential (aka workspace). Go to step 0720;

Step 0720, Check-in: check into workspace, & compose image for the user according to policy at the remote server or storage. Go to step 0722;

Step 0721, Local task uses local increment resource, and read-only network OS image. Go to step 0722;

Step 0722, Enter differential algorithm, & use streaming protocol during communication.

The Composition & Decomposition for Application Image Formation

Figure 8:
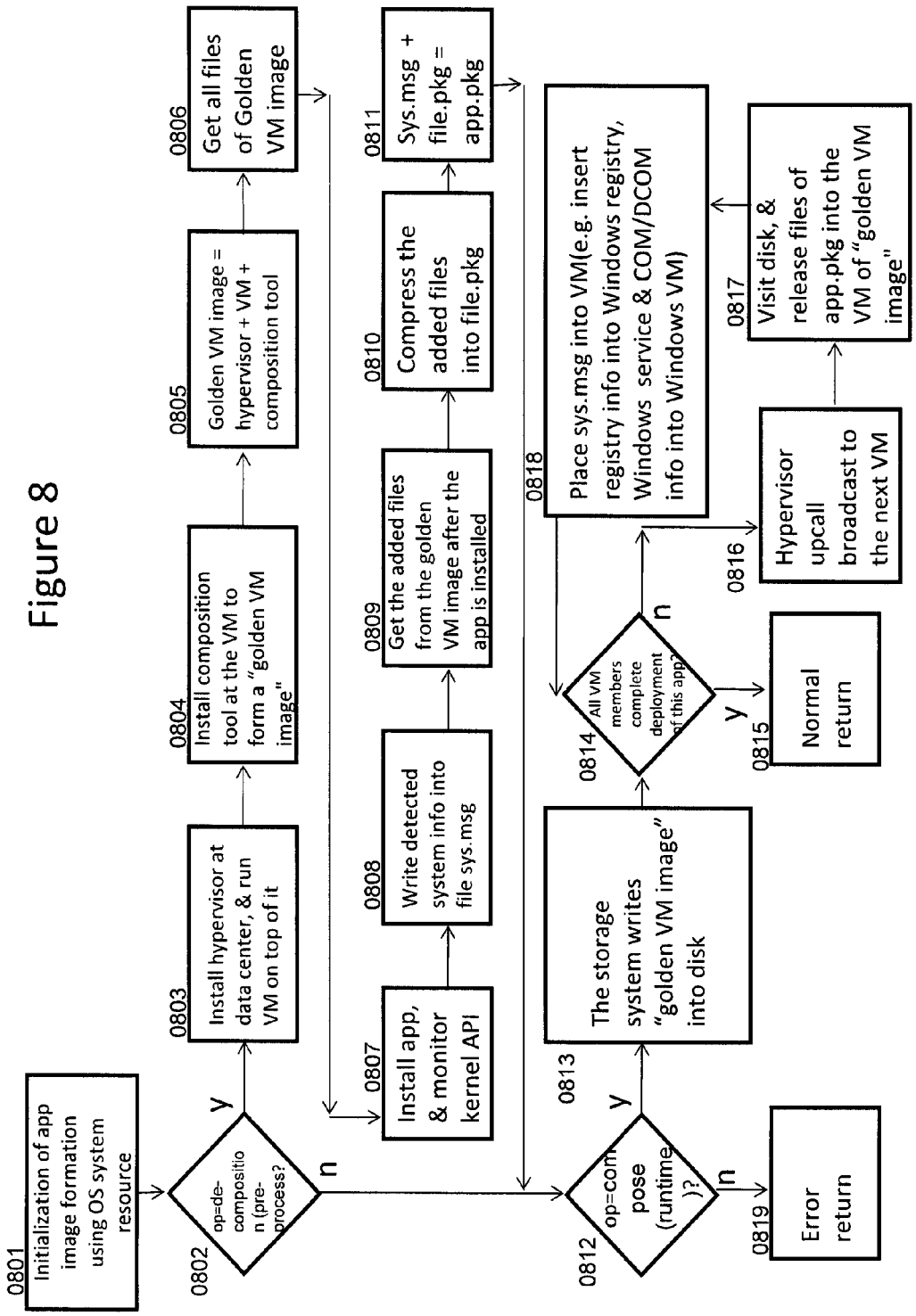
FIG. 8 is a flowchart of an embodiment based on this invention for CSV architecture "The composition & decomposition of app image formation", explaining steps 0705, 0706, 0711, and 0717 of FIG. 7.

FIG. 8 is the flowchart of composition and decomposition for application image formation. This is a detailed explanation for steps 0705, 0706, 0711, and 0717 in FIG. 7. Decomposition is a pre-processing activity of application virtualization. Its purpose is to decompose an application tightly coupled with OS, into multiple files, and package these files together to store. Composition is an action to combine application components into the VM, i.e. to embed that the registry, service, COM, and DCOM of the Windows application into Windows VM. In fact, because user VMs may run on the same physical server, the composition (or deployment) need not go through TCP/IP of outside communication line. Rather, the broadcasting function in VMM is used to rapidly deploy application uniformly for multiple users (provided that these users belong to the same user group, use homogeneous VM, and same application). The broadcasting function of in this uniform deployment is part of the upcall idea, which is described in the Chinese patent of application number 2020183844.6, titled "A method of kernel bus system to build Virtual Machine Monitor and the performance service framework".

Further, the app.pkg in steps 0811, 0817 and 0818 is normally in a compressed format to compose with the golden image of VM, and is then saved to the server disk. When the composed image needs to be modified (e.g. new applications are added), or when it is streamed to the client, the image is read from disk. If the VMM supports Linux OS (e.g. LXC, KVM, XEN), it is necessary first replace read/write-to-file with read/write-to-sector, and then replace read/write-to-sector with read/write-to-qcow2.

The composing and decomposing method disclosed here under the general context of CSV is part of the application virtualization technology, while the method is applied to a VM/VMM environment in this invention.

The Workflow Comprises:

Step 0801, initialize the application image formation using OS system resource. Go to step 0802;

Step 0802, determine if the operation is decomposing a virtual application. If yes, go to step 0803. Otherwise, go to step 0812;

Step 0803, install hypervisor and run VM on top of it. This is done in data center. Go to step 0804;

Step 0804, install a composition tool at the VM to form a "golden VM image". Go to step 0805;

Step 0805, golden VM image=hypervisor+VM+composition tool. Go to step 0806;

Step 0806, Get all files of Golden VM image. Go to step 0814;

Step 0807, Install app, & monitor kernel API. Go to step 0808;

Step 0808, Write detected system info into file sys.msg. Go to step 0809;

Step 0809, Get the added files from the golden VM image after the app is installed. Go to step 0810;

Step 0810, Compress the added files into file.pkg. Go to step 0811;

Step 0811, sys.msg+file.pkg=app.pkg. The app.pkg is written to disk. Go to step 0812;

Step 0812, determine if the operation is to compose virtual application. If yes, go to step 0813. Otherwise, go to step 0819;

Step 0813, the repository system writes "golden VM image" into disk (See step 0512 to 0521 in FIG. 5A). When image is to be deployed into multiple VMs, the image is first read from disk into ring buffers, then go to step 0814;

Step 0814, determine if all VM members complete deployment of this app. If yes, go to step 0816. Otherwise, go to step 0815;

Step 0815, return normally;

Step 0816, hypervisor upcall broadcast to the next VM;

Step 0817, Visit disk, & release files of app.pkg into the VM of "golden VM image". Go to step 0818;

Step 0818, compose file "sys.msg" into VM (e.g. insert registry information into Windows registry, Windows service & COM/DCOM information into Windows VM). Go to step 0814;

Step 0819, return with error.

Differential Algorithm

Figure 9:
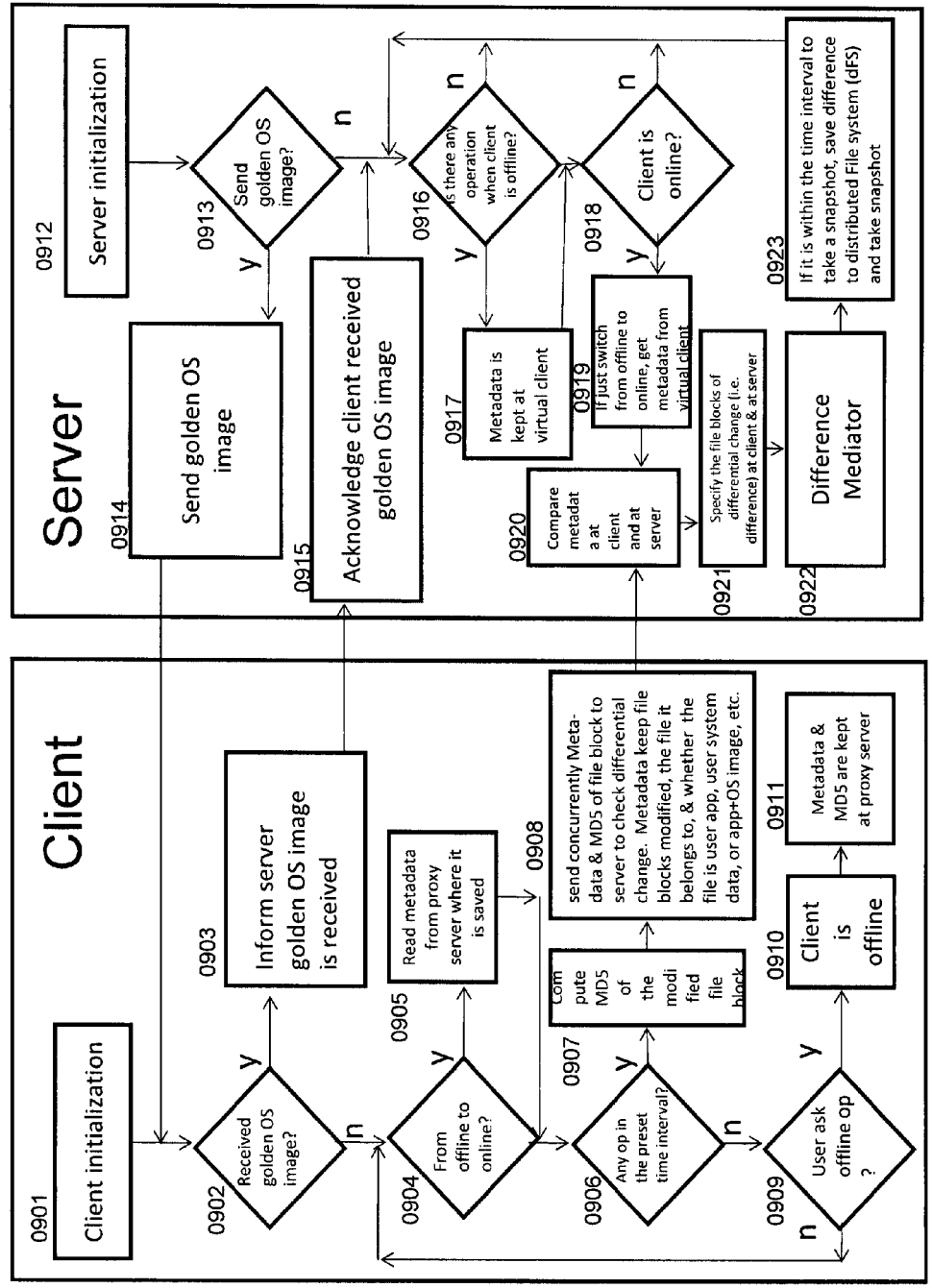
FIG. 9 is a combined block diagram and flowchart of an embodiment based on this invention for CSV architecture "differential algorithm", explaining step 0722 of FIG. 7 regarding the details of differential algorithm.

FIG. 9 is a combined block diagram and flowchart of differential algorithm. Block 091 describes the steps of client differential algorithm, and block 092 contains steps of server differential algorithm. Differential algorithm uses metadata and file block, rather than file handling, to speed up the discerning and delivering processes. At the client, after the golden image is received, any operation may generate differential. When the client is online, it may set a time interval to check differential, say every 90 seconds, to see if any file block is changed. Calculate the MD5 value of these changed file blocks, and send the metadata of these file blocks to server. MD5 is one type of checksum. Its encryption algorithm produces a 128-bit hash value. Metadata includes ID of file changed, the file that file block belong to, and whether the file is user application, user system data, or application+OS image, etc. At the server there may also be files modified. After receiving the metadata and MD5 information, the server performs difference solution to synchronize the difference and then takes snapshots. When client becomes offline, metadata and MD5 values of file block are saved in client's "proxy server". The proxy server is a temporary storage place for offline client. Similarly, there is a "virtual client" at the server, a temporary storage place for the generated difference by files at the server when client is offline.

To compare this invention with the patent U.S. Pat. No. 7,447,854B1 to Cannon, et al. on the high-level operation, Cannon does not apply to the general context of CSV and does not use the ideas like application isolation, bi-directionness, metadata comparison, proxy server and virtual client. As to the comparison of the low-level disk operation, please see the embodiments of FIG. 5B, FIG. 23, and FIG. 24.

The workflow of client 091 comprises:

Step 0901, client initializes itself. Go to step 0902;

Step 0902, determine if the golden OS image is received. If yes, go to step 0903. Otherwise, go to step 0904;

Step 0903, inform server the OS image is received. Go to step 0915;

Step 0904, determine if client has just become online from offline. If yes, go to step 0905. Otherwise, go to step 0906;

Step 0905, read the metadata saved in the proxy server. Go to step 0906;

Step 0906, determine if the client has any operation during the preset time-interval. If yes, go to step 0907. Otherwise, go to step 0909;

Step 0907, calculate the MD5 of file blocks modified. Go to step 0908;

Step 0908, send concurrently Meta-data & MD5 of file block to server to check differential change. Metadata keep file blocks modified, the file it belongs to, & whether the file is user app, user system data, or app+OS image, etc. Go to step 0920;

Step 0909, determine if the client requests offline operation. If yes, go to step 0910. Otherwise, go to step 0904, and keep on checking in the loop;

Step 0910, client becomes offline. Go to step 0911;

Step 0911, when user operates in offline mode, metadata and MD5 are saved in proxy server;

The workflow of server 092 comprises:

Step 0912, server initializes itself. Go to step 0913;

Step 0913, determine if the operation is sending out OS image. If yes, go to step 0914. Otherwise, go to step 0916;

Step 0914, send OS-image to the client. Go to step 0902;

Step 0915, acknowledge the golden OS image is received by the client. Go to step 0916;

Step 0916, determine if there is any operation at server when client operation is offline. If yes, go to step 0917. Otherwise, go to step 0918;

Step 0917, Metadata is kept at virtual client. Go to step 0922;

Step 0918, determine if client is online. If yes, go to step 0919. Otherwise, go to step 0916;

Step 0919, if just switch from offline to online, get metadata from virtual client. Go to step 0920;

Step 0920, compare the metadata at client and at server. Go to step 0921;

Step 0921, specify the file blocks of differential change (i.e. difference) at client & at server. Go to step 0922;

Step 0922, perform Difference Mediator. Go to step 0923;

Step 0923, save the difference by taking the snapshot if it is within the time interval of taking a snapshot.

Difference Mediator

Figure 10:
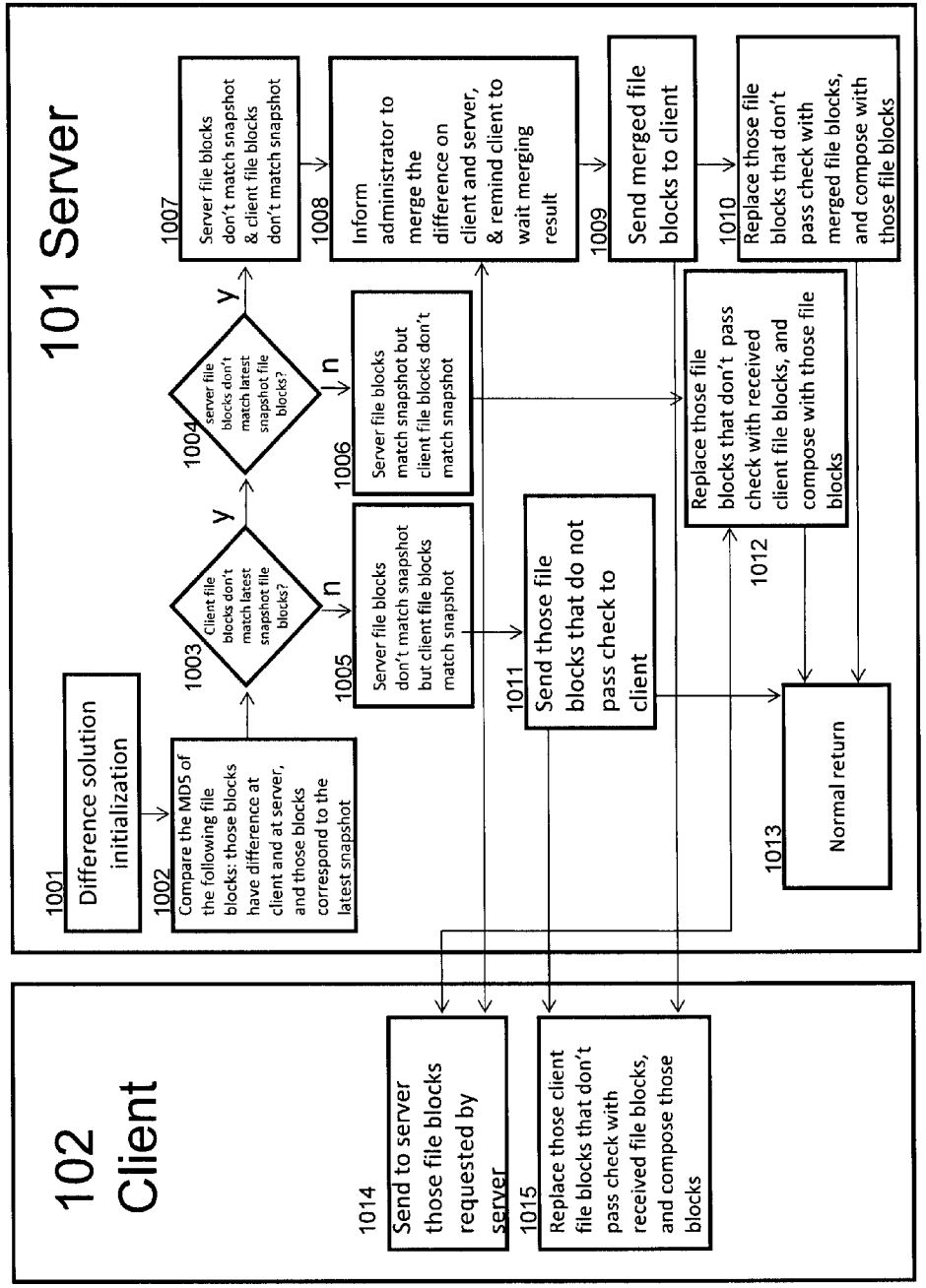
FIG. 10 is a combined block diagram and flowchart of an embodiment based on this invention for CSV architecture "Difference Mediator", explaining step 0922 of FIG. 9.

FIG. 10 is a combined block diagram and flowchart of difference mediator. BlockI 101 describes the steps of difference solution at server, and block 102 contains steps of difference solution at client. Difference solution compares the MD5 of the modified file blocks at client, at server, and with the previous snapshot. The purpose is to discover file blocks modified (1) by client only, (2) by server only, and (3) by both client and server. In (1), the modified file blocks need to be sent from client to server to compose snapshot. In (2), the modified file blocks need to be sent from server to client for re-composition. In (3), an administrator must perform merge operation. After merging, the client and server compose their images using the new file blocks.

Figure 11:
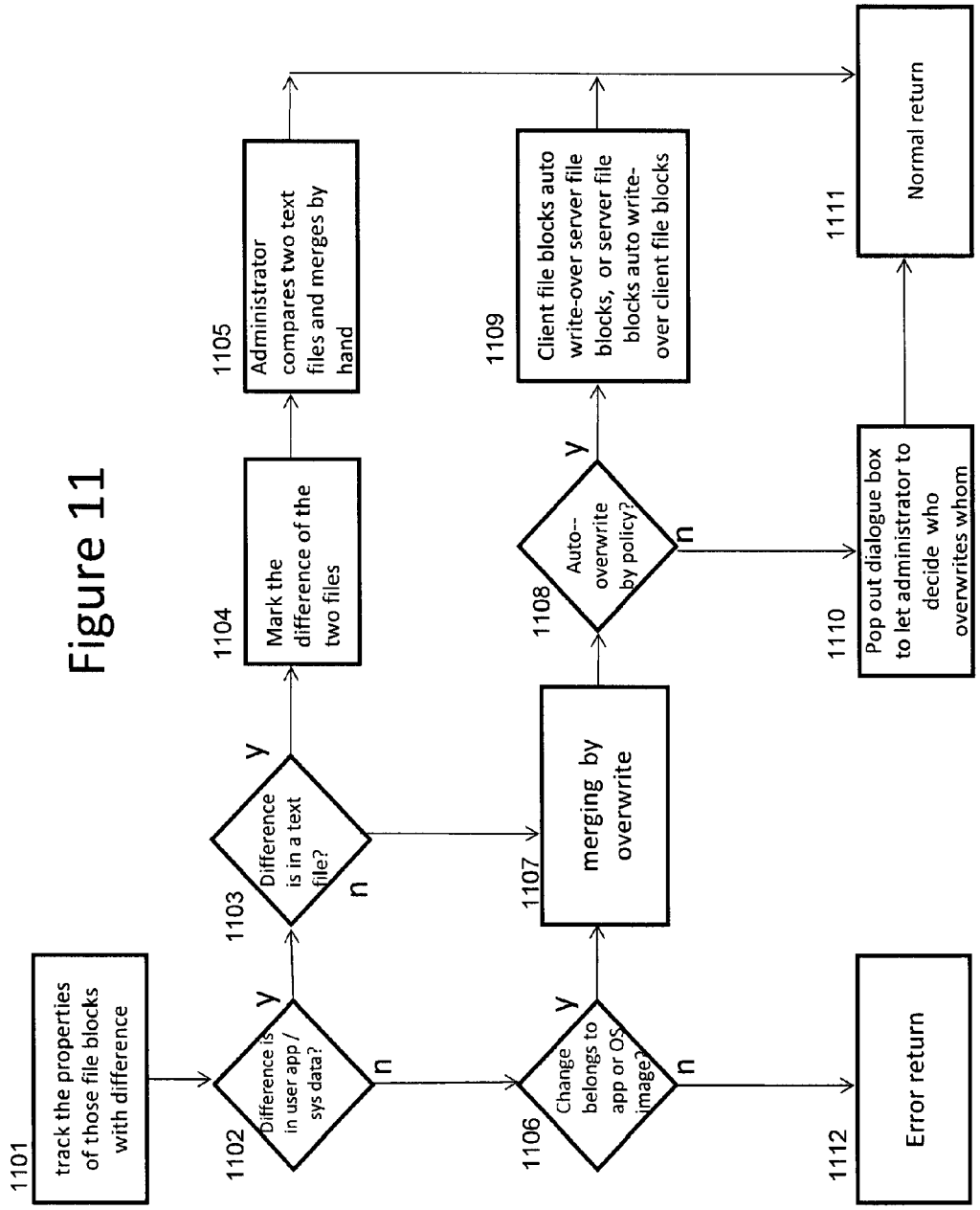
FIG. 11 is a flowchart of an embodiment based on this invention for CSV architecture "Merge Operation", explaining step 1008 of FIG. 10.

The workflow of server 101 comprises:

Step 1001, difference solution initializes itself. Go to step 1002;

Step 1002, compare the MD5 of the following file blocks: those blocks have difference at client and at server, and those blocks correspond to the latest snapshot. Go to step 1003;

Step 1003, compare MD5. Determine if Client file blocks don't match latest snapshot file blocks. If not, go to step 1004. Otherwise, go to step 1005;

Step 1004, compare MD5. Determine if server file blocks don't match latest snapshot file blocks. If not, go to step 1007. Otherwise, go to step 1006;

Step 1005, server file blocks don't match snapshot but client file blocks match snapshot. Go to step 1011;

Step 1006, server file blocks match snapshot but client file blocks don't match snapshot. Go to step 1012;

Step 1007, server file blocks don't match snapshot & client file blocks don't match snapshot. Go to step 1008;

Step 1008, inform administrator to merge the difference on client and server. Server acquires modified client file block via client's step 1014. The details of the merge operation are illustrated in FIG. 11. Finally, remind client to wait merging result. Go to step 1009;

Step 1009, send the merged file blocks to client of step 1015. Go to step 1010;

Step 1010, replace those file blocks that don't pass check with merged file blocks, and compose with those file blocks. Go to step 1013;

Step 1011, send those file blocks that do not pass check to client step 1015. Go to step 1015;

Step 1012, inform client about the file block not matched, and then send out these file block via client step 1014. Replace those file blocks that don't pass check with received client file blocks, and compose with those file blocks. Go to step 1013;

Step 1013, return normally.

The workflow of client 102 comprises:

Step 1014, send to server those file blocks requested by server;

Step 1015, replace those client file blocks that don't pass check with received file blocks, and compose those blocks.

Merge Operation

FIG. 11 is the flowchart of merge operation. Merge operation includes automatic merge (i.e. overwrite) and manual merge. If user data is text files, it is possible to mark the modified portion to perform manual merge. If the file is none-text user data or image, the only possibility is an automatic merge or automatic overwrite. The workflow comprises:

Step 1101, track the properties of those file blocks with difference. Go to step 1102;

Step 1102, determine if difference is in user application data or system data. If it is application data, go to step 1103. Otherwise, go to step 1106;

Step 1103, determine if difference is in a text file. If yes, go to step 1104. Otherwise, go to step 1107;

Step 1104, mark the difference of the two files. Go to step 1105;

Step 1105, administrator compares two text-files and merges by hand. Go to step 1111;

Step 1106, determine if difference belongs to application (or OS) image. If yes, go to step 1107. Otherwise, go to step 1112;

Step 1107, overwrite merge. Go to step 1108;

Step 1108, determine if auto-overwrite by policy. If yes, go to step 1109. Otherwise, go to step 1110;

Step 1109, client file blocks auto write-over server file blocks, or server file blocks auto write-over client file blocks. Go to step 1111;

Step 1110, pop out dialogue box to let administrator decide who overwrites whom. Go to step 1111;

Step 1111, return normally;

Step 1112, return with error.

Streaming Protocol

Figure 12:
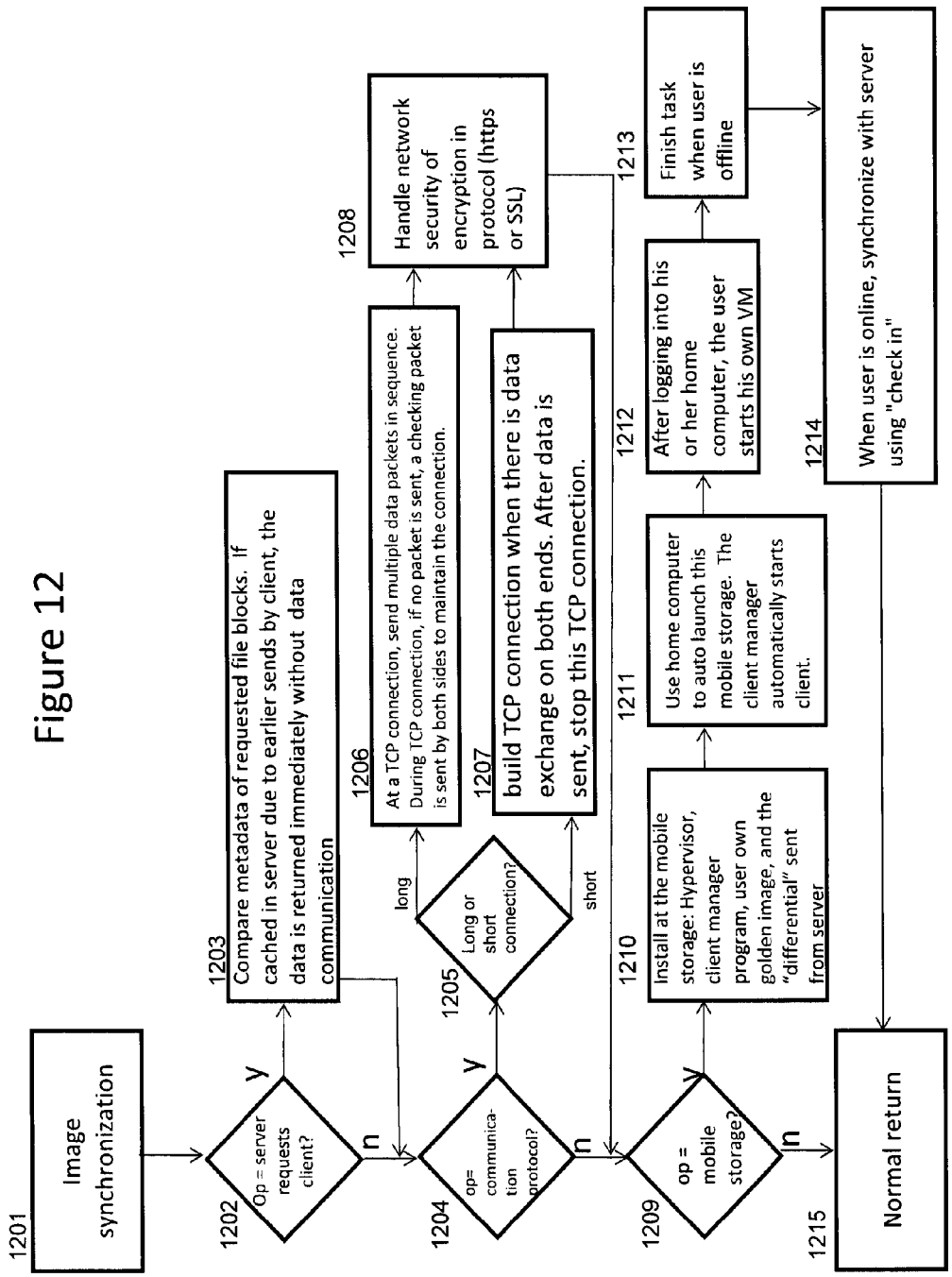
FIG. 12 is a flowchart of an embodiment based on this invention for CSV architecture "Streaming Protocol", explaining step 0214 of FIG. 2.

FIG. 12 is the flowchart of streaming protocol. If the metadata of a file block tells server the requested block is in communication cache already (because the block was previously sent by other clients), the server can read the block from cache, rather than get it from client via communication. As for communication protocol, there are long connection and short connection. Long connection may continuously send multiple data packets for one TCP connection. When TCP connection is there but no data packet is sent, both sides need to sent checking packets to maintain the connection. Short connection builds a TCP connection once there is data interchange between the communication partners. TCP disconnects right after the data transmission is completed.

If the client is a removable storage device, the hypervisor and golden image must be stored on it first. During runtime, the differential is sent from the server to the device. When the user plugs the removable storage into a third-party computer (e.g. home computer), the client manager automatically launch a client at the computer. After user login, the offline task can be performed. At the reconnection, the "check-in" method is used to synchronize with the server. The workflow comprises:

Step 1201, come from image synchronization of FIG. 7. Go to step 1202;

Step 1202, determine if the operation is a file-block request to client from server. If yes, go to step 1203. Otherwise, go to step 1204;

Step 1203, compare the metadata of requested file blocks. If cached in server due to earlier sends by client, the data is returned immediately without data communication. Go to step 1204;

Step 1204, determine if the operation is communication protocol. If yes, go to step 1205. Otherwise, go to step 1209;

Step 1205, determine if the operation is long connection or short connection. If it is a long connection, go to step 1206. Otherwise, go to step 1207;

Step 1206, at a TCP connection, send multiple data packets in sequence. During TCP connection, if no packet is sent, a checking packet is sent by both sides to maintain the connection. Go to step 1208;

Step 1207, build TCP connection when there is data exchange on both ends. After data is sent, stop this TCP connection. Go to step 1208;

Step 1208, handle the network security of encryption in protocol (https or SSL). Go to step 1209;

Step 1209, determine if the operation is for removable storage. If yes, go to step 1210. Otherwise, go to step 1215;

Step 1210, store hypervisor, client manager program, and user's own golden image. Plus, at runtime, the differential is sent from server to the removable storage device. Go to step 1211;

Step 1211, use third-party computer to launch automatically the removable storage, as the client manger starts up the client at the third-party computer. Go to step 1212;

Step 1212, after logging into his or her home computer, the user starts his own VM. Go to step 1213;

Step 1213, finish the task when user is offline. Go to step 1214;

Step 1214, when user is online, synchronize with server using "check in". Go to step 1215;

Step 1215, return normally.

The eBag Architecture

Figure 13:
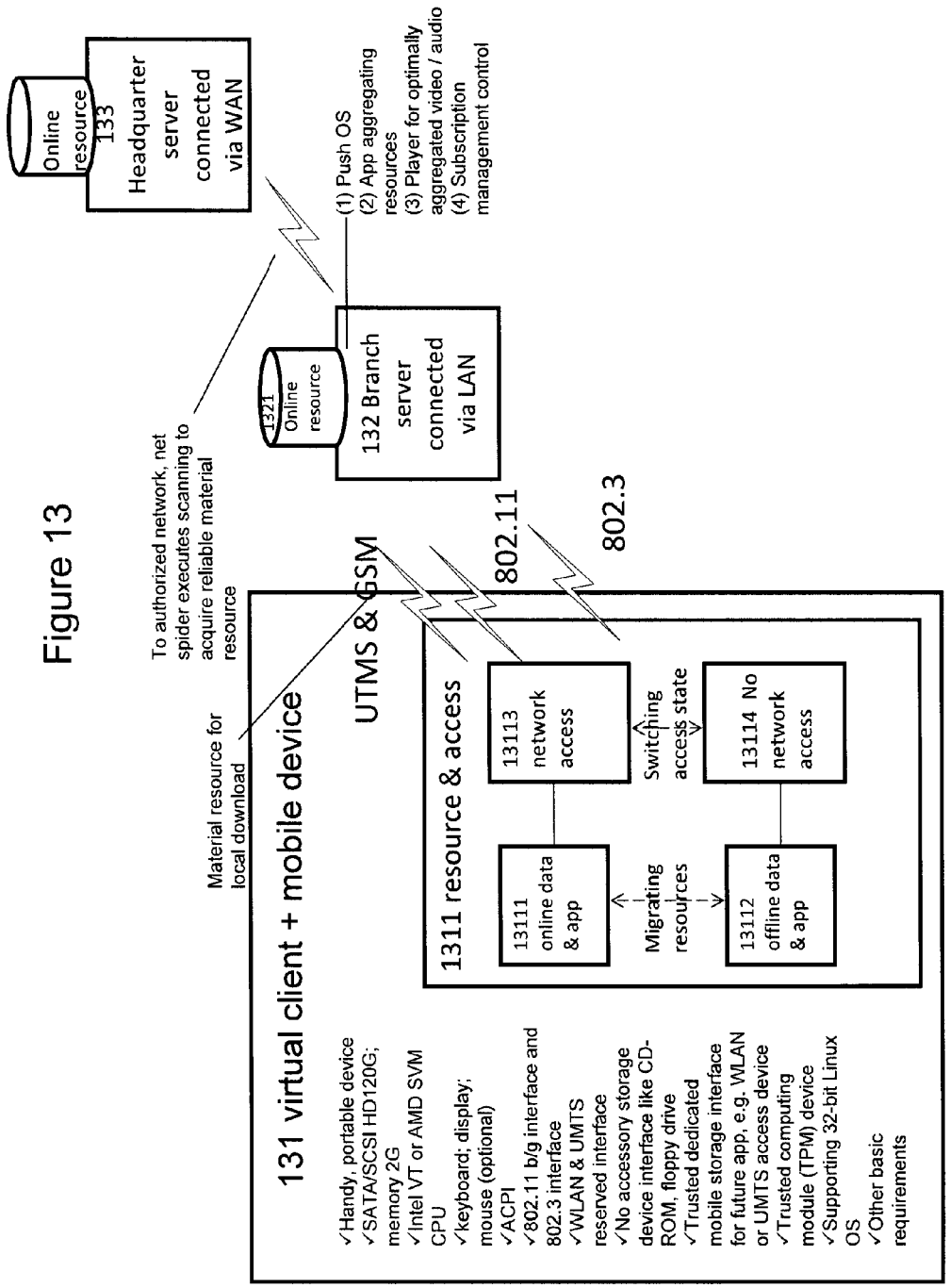
FIG. 13 is a block diagram of an embodiment based on this invention for CSV "eBag (eSchoolbag or eBriefcase) system architecture"

FIG. 13 is the block diagram of the eBag (a name for combined eSchoolbag and eBriefcase) architecture. Block 131 in the diagram is the eBag. It is also a CSV client described above. It can be a desktop, mobile device or removable storage. Block 132 is a server for a school or a branch office, connected with clients via local net. Such a connection provides rich material resource for the client, via either UTMS/GMS, 802.11 or 802.3 local-net protocols, with resource downloaded to local client. Block 133 is a server at headquarter or education bureau, connected with branch office or school via wide-area network. To authorized network, net spider executes scanning to acquire reliable material resource from the headquarter server to the branch server 132.

The following is the sample specification of a mobile eBag:
Handy, portable device
SATA/SCSI HD120 G; memory 2 G
Intel VT or AMD SVM CPU
keyboard; display; mouse (optional)
ACPI
802.11b/g interface and 802.3 interface
WLAN & UMTS reserved interface
No accessory storage device interface like CD-ROM, floppy drive
Trusted dedicated mobile storage interface for future app, e.g. WLAN or UMTS access device
Trusted computing module (TCM or TPM) device
Supporting 32-bit Linux OS
Other basic requirements Block 131 virtual client also comprises the block 1311 "resource and access". This is an important function of eBag. Resource and access 1311 describes eBag's 2 states of data and application: Block 13111 online data and application, as well as block 13112, offline data and application. When the state is changed, there is resource migration. Block 13111 online data and application depend on block 13113 network access. Block 13112 offline data and application is in a none-network access state of block 13114. The interchange between online state and offline state indicates state switch between network access of block 13113 and none-network access of block 13114.

Branch server 132 also comprises online resource 1321, where the most important resources are: (1) Push-OS; (2) Application aggregating resources; (3) Player for optimally aggregated video/audio; and (4) Subscription management control service.

The eBag architecture can be used for both education environment and office environment. For office environment, "eBreifcase" architecture includes block 131 as eBriefcase, block 132 as branch server, and block 133 as headquarter server. For education environment, "eSchoolbag" architecture includes block 131 as eSchoolbag, block 132 is school server, and block 133 is education bureau server.

Push-OS Server

Figure 14:
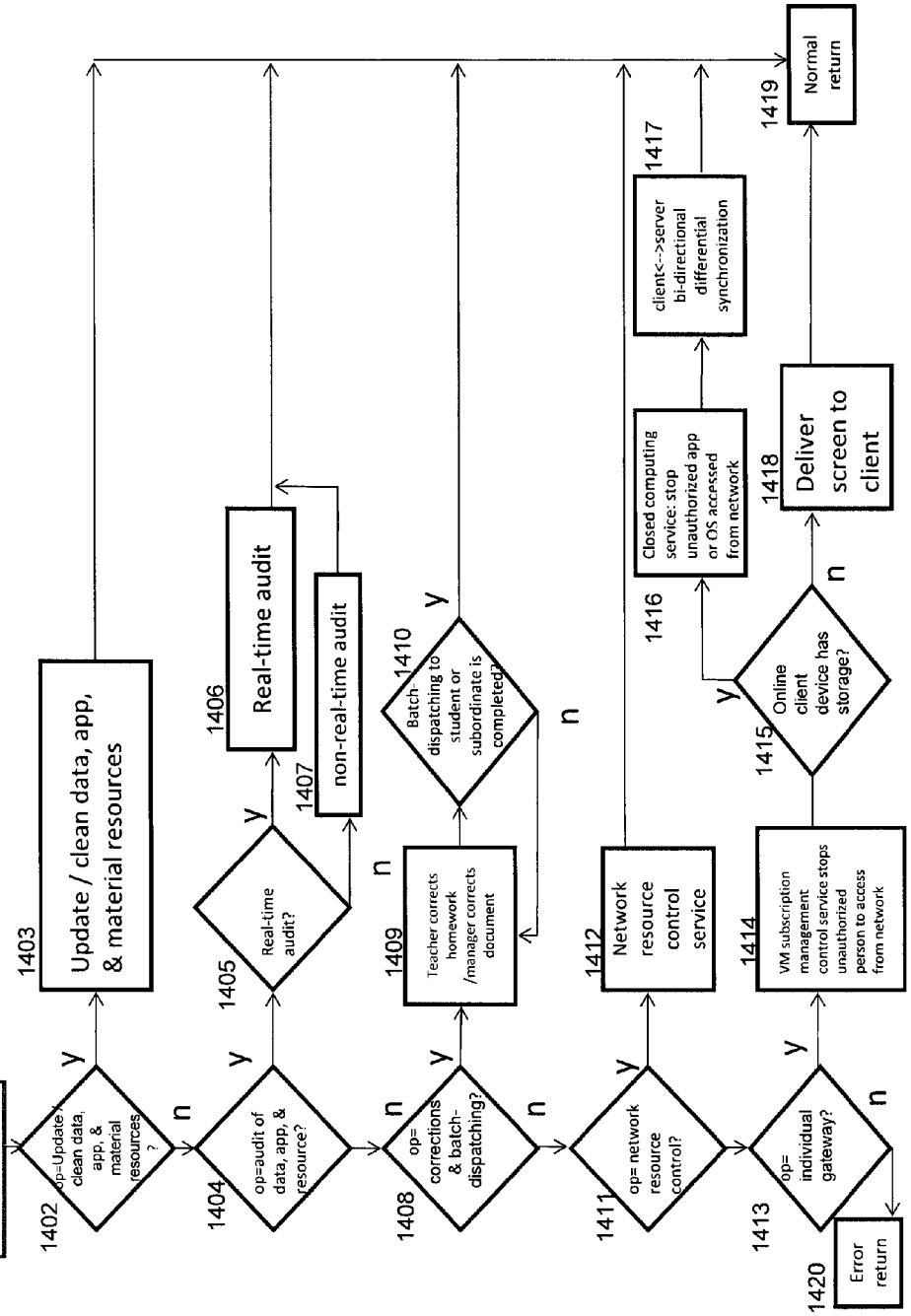
FIG. 14 is a flowchart of an embodiment based on this invention for eBag architecture "Push-OS server", explaining block 1321 online resource of FIG. 13, wherein the first resource of Push-OS server.

FIG. 14 is the flowchart of push-OS server. The operations of the server includes update and clearup of data, application, and resource; the audit of data, application, and resource can be realtime and non-realtime; administrator or manager corrects submitted document and perform batch dissemination; network resource control and personal gateway provides access and VM subscription management control. The workflow comprises:

Step 1401, push-OS server prepares VMs. Go to step 1402;

Step 1402, determine if the operation is upgrade and clearup of data, application and resource. If yes, go to step 1403. Otherwise, go to step 1404;

Step 1403, upgrade and clearup of data, application and resource;

Step 1404, determine if the operation is the audit of data, application and resource. If yes, go to step 1405. Otherwise, go to step 1408;

Step 1405, determine if the realtime audit. If yes, go to step 1406. Otherwise, go to step 1407;

Step 1406, perform realtime audit. Go to step 1419;

Step 1407, perform none-realtime audit. Go to step 1419;

Step 1408, determine if the operation is document correction and batch dissemination. If yes, go to step 1409. Otherwise, go to step 1411;

Step 1409, teacher corrects homework or manager corrects documents. Go to step 1410;

Step 1410, determine if batch dissemination to student or subordinate is completed. If yes, go to step 1419. Otherwise, go to step 1409;

Step 1411, determine if the operation is network resource control. If yes, go to step 1412. Otherwise, go to step 1413;

Step 1412, perform network resource control service. Go to step 1419;

Step 1413, determine if it is personal gateway. If yes, go to step 1414. Otherwise, go to step 1420;

Step 1414, VM subscription management control service stops unauthorized person to access from network. Go to step 1415;

Step 1415, determine if the online client has storage. If yes, go to step 1418. Otherwise, go to step 1416;

Step 1416, closed computing service (see FIG. 17): stop unauthorized application or OS accessed from network. Go to step 1417;

Step 1417, perform client←—→server bi-directional differential synchronization. Go to step 1419;

Step 1418, deliver the screen to client. Go to step 1419;

Step 1419, return normally;

Step 1420, return with error.

Push-OS Client

Figure 15:
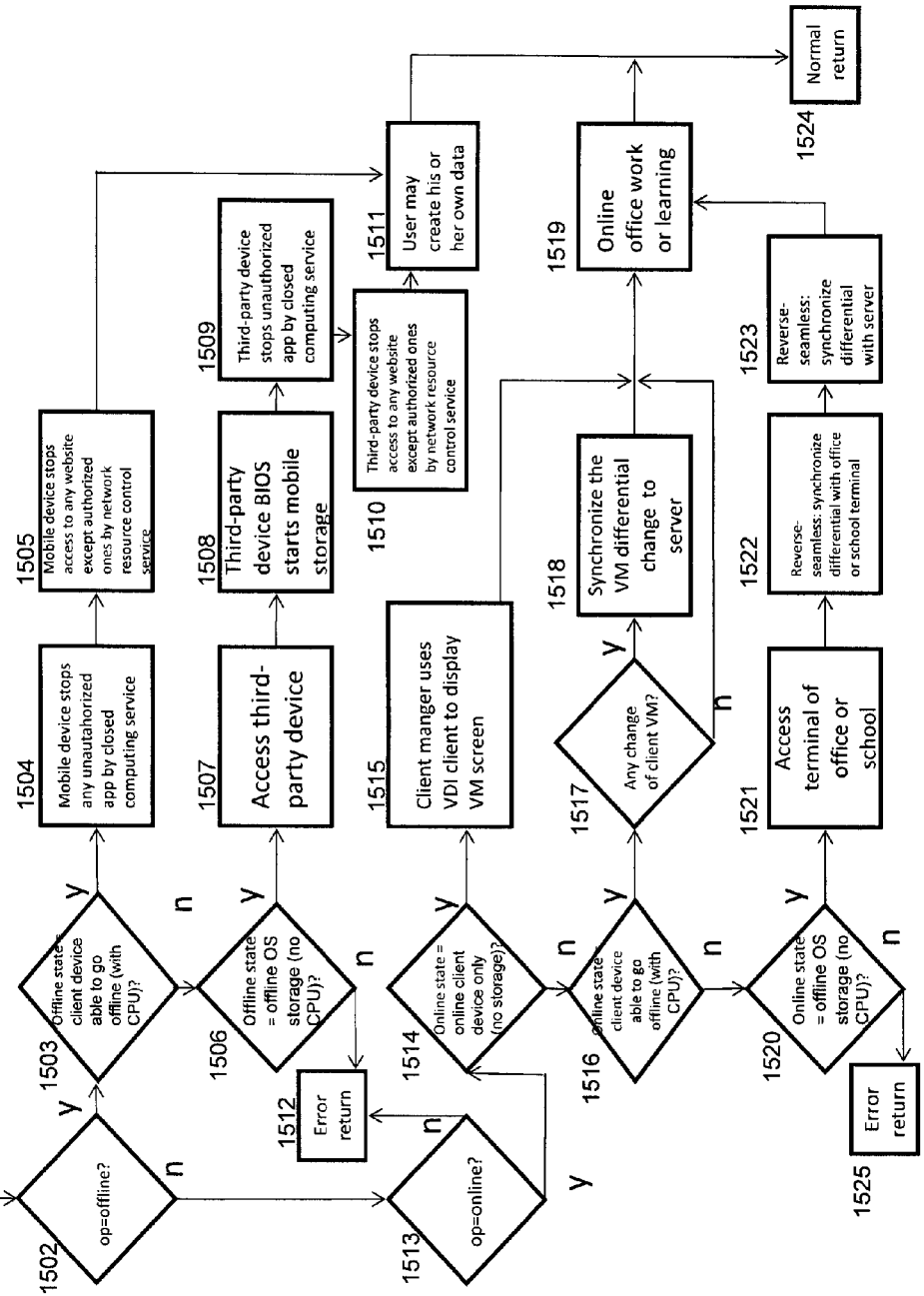
FIG. 15 is a flowchart of an embodiment based on this invention for eBag architecture "Push-OS client", explaining block 1321, online resources, of FIG. 13, wherein the first resource of Push-OS client.

FIG. 15 is the flowchart of push-OS client. Push-OS client comprises the following characteristics:

The client device with CPU and able to go offline, when it is offline, uses closed computing service to prohibit any unauthorized application, and uses network resource control service to stop connection with any website except the designated ones;

The removable storage without CPU, being offline only, accesses the third-party device, prohibits any unauthorized application via closed computing services, and prohibits connection to any undesignated website via network resource control services;

The client device without storage and being online only, has to use, online, the VDI client-side display device to display the screen of the VM on the server.

The client device with CPU and able to go offline, synchronized the differential of VM with the server.

The removable storage without CPU, being offline only, synchronize the differential with the online device, and also synchronize the differential with the server.

The Workflow Comprises:

Step 1501, push-OS client initializes itself. Go to step 1502;

Step 1502, determine if the operation is offline. If yes, go to step 1503. Otherwise, go to step 1511;

Step 1503, determine if the offline state belongs to a client device able to go offline (with CPU). If yes, go to step 1504. Otherwise, go to step 1506;

Step 1504, Mobile device stops any unauthorized app by closed computing service. Go to step 1505;

Step 1505, Mobile device stops access to any website except authorized ones by network resource control service. Go to step 1511;

Step 1506, determine if offline state belongs to a offline OS storage (no CPU). If yes, go to step 1507. Otherwise, go to step 1512;

Step 1507, access the third-party device. Go to step 1508;

Step 1508, third-party device BIOS starts the mobile storage. Go to step 1509;

Step 1509, third-party device stops unauthorized app by closed computing service. Go to step 1510;

Step 1510, third-party device stops access to any website except authorized ones by network resource control service. Go to step 1511;

Step 1511, user may create his or her own data. Go to step 1524;

Step 1512, return with error;

Step 1513, determine if the operation is online. If yes, go to step 1514. Otherwise, go to step 1512;

Step 1514, determine if online state=online client device only (no storage). If yes, go to step 1515. Otherwise, go to step 1516;

Step 1515, client manger uses VDI client to display VM screen. Go to step 1519;

Step 1516, determine if online state=client device able to go offline (with CPU). If yes, go to step 1517. Otherwise, go to step 1520;

Step 1517, determine if there is any change of client VM. If yes, go to step 1518. Otherwise, go to step 1519;

Step 1518, synchronize the VM differential change to server. Go to step 1519;

Step 1519, perform online office work or learning. Go to step 1524;

Step 1520, determine if Online state=offline OS storage (no CPU). If yes, go to step 1521. Otherwise, go to step 1525.

Step 1521, access the terminal of office or school. Go to step 1522;

Step 1522, reverse-seamless: synchronize differential with office or school terminal. Go to step 1523;

Step 1523, Reverse-seamless: synchronize differential with server. Go to step 1519;

Step 1524, return normally;

Step 1525, return with error.

VM Subscription Management Control and Network Resource Control

Figure 16:
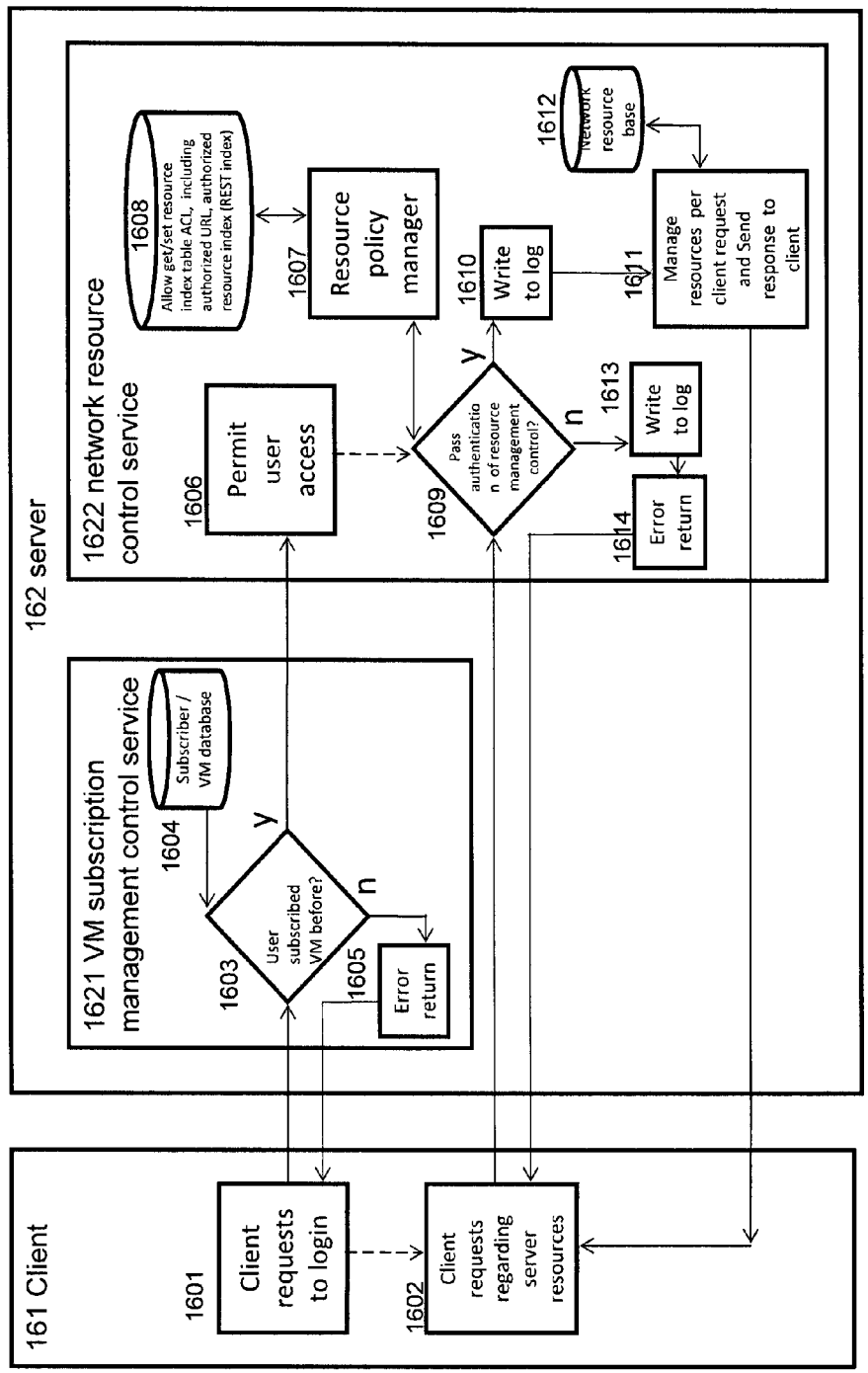
FIG. 16 is a flowchart of an embodiment based on this invention for eBag architecture "VM subscription management control & network resource control", wherein block 1621, VM subscription management control, explains step 1414 of FIG. 14, block 1622, network resource control, explains step 1412 of FIG. 14 and steps 1505, 1514 of FIG. 15.

FIG. 16 is a combined block diagram and flowchart of VM subscription management control and network resource control. Block 161 is the client, where the main function is to send access request and resource request to the server. Block 162 is the server, containing block 1621 VM management control service, and block 1622 network resource control service. The workflow is as follows:

This control system may be implemented by a RESTful architecture on top of HTTP or HTTPs. The client 1621 requests to the server 1622 with signals and commands, but not data payloads. The payload is conveyed by the CSV bi-directional synchronization mechanism, independent of the RESTful communication. The step 1611 described below is the "joint" between these two mechanisms. The step may manage the requested resources, inform the CSV bi-directional synchronization mechanism for data payload, and send response back to the client.

Block 161 describes client steps:

Step 1601, push-OS client initializes itself. Go to step 1603;

Step 1602, Client requests regarding server resources. Go to step 1609;

Block 1621 describes steps of VM management control service:

Step 1603, determine if User subscribed VM before. If yes, go to step 1606. Otherwise, go to step 1605;

Step 1604 is a Subscriber/VM database. It provides data to step 1603;

Step 1605, return with error. Inform client to execute the software component of step 1601;

Block 1622 describes the steps of network resource control service:

Step 1606, permit the client to access. After the client requests resource, go to step 1609;

Step 1607, resource policy manager provides policies to facilitate the execution of step 1609;

Step 1608, resource policy base contains the index table of permitted r/w resource ACL, including authorized URL, authorized resource index (REST index), etc. It uses resource policy manager to perform step 1607;

Step 1609, determine if the client passes the authentication of resource management control. If yes, go to step 1610. Otherwise, go to step 1613;

Step 1610, write to log. Go to step 1611;

Step 1611, manage resources per client request and send response to the client who makes the request regarding server resources. Managing server resources may trigger the CSV bidirectional synchronization mechanism so that data, application and OS on the server may be changed (e.g. automatically or by an administrator) and then synchronized with the client;

Step 1612, network resource base provides resource to step 1611;

Step 1613, write to log. Go to step 1614;

Step 1614, return with error, and inform step 1602 of the client which requests the resource.

Client-Side Closed Computing Service

Figure 17:
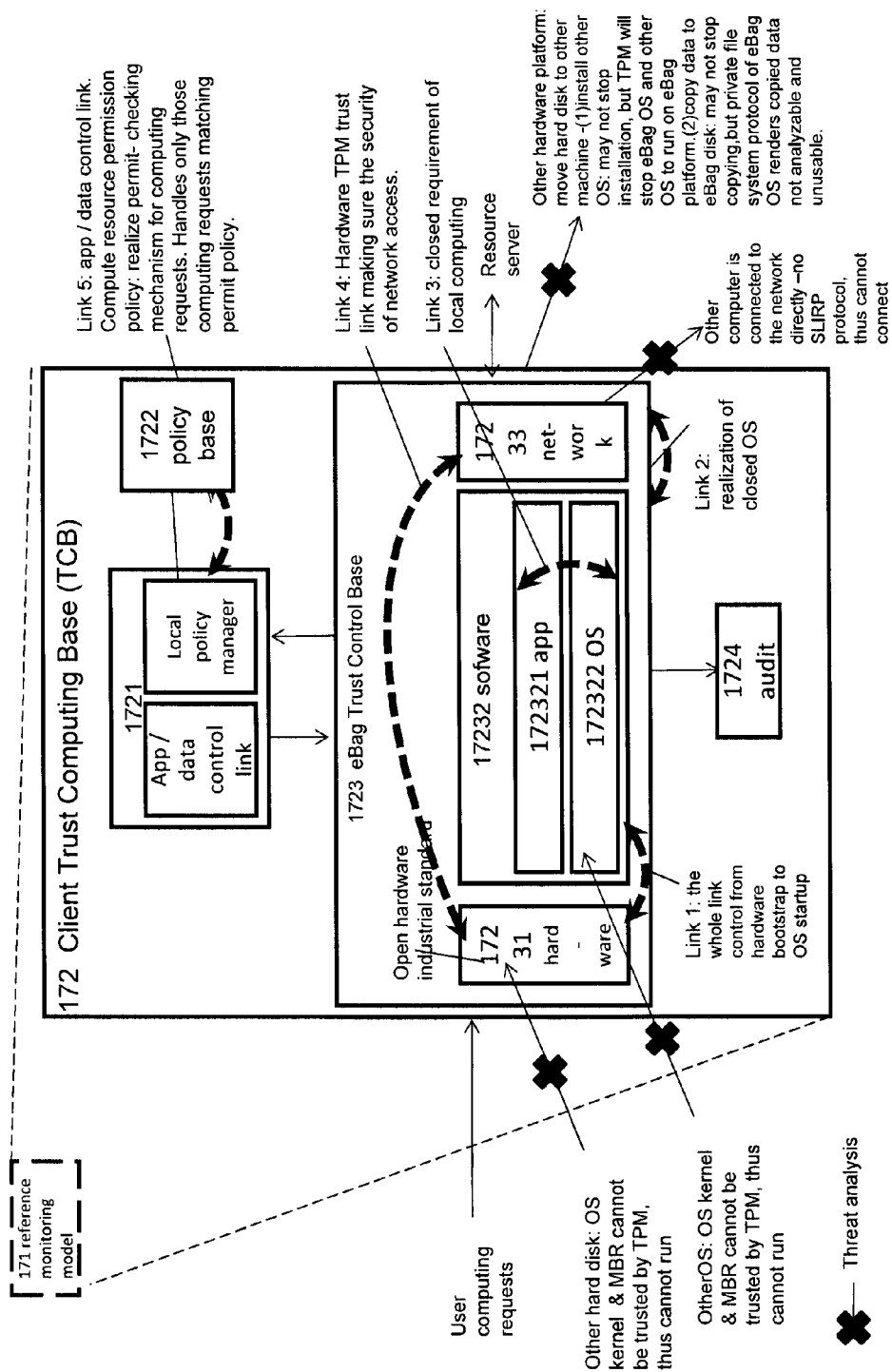
FIG. 17 is a block diagram of an embodiment based on this invention for eBag architecture "client closed computing service", explaining step 1416 of FIG. 14, and steps 1504, 1509 of FIG. 15.

FIG. 17 is a block diagram for the client-side closed computing service of the invention.

Block 171 of the diagram is a reference monitoring model. This is based on a complete Reference Monitor Model formulated by the following TCB model (called trust computing, or TC, model). Block 172 is the client-side Trust Computing Base (TCB). TCB includes block 1721 application/data control link, block 1723 eBag TCB, and block 1724 audit.

The application/data control link of Block 1721 exercises control via computing resource permission policies, and realizes permission check mechanism to computing requests: only after being permitted by the permission policy can a computing request be handled. The application and data are permitted by local policy manager. This is the fifth security link beyond the following 4 security link. An embodiment is described by FIG. 16.

Figure 18:
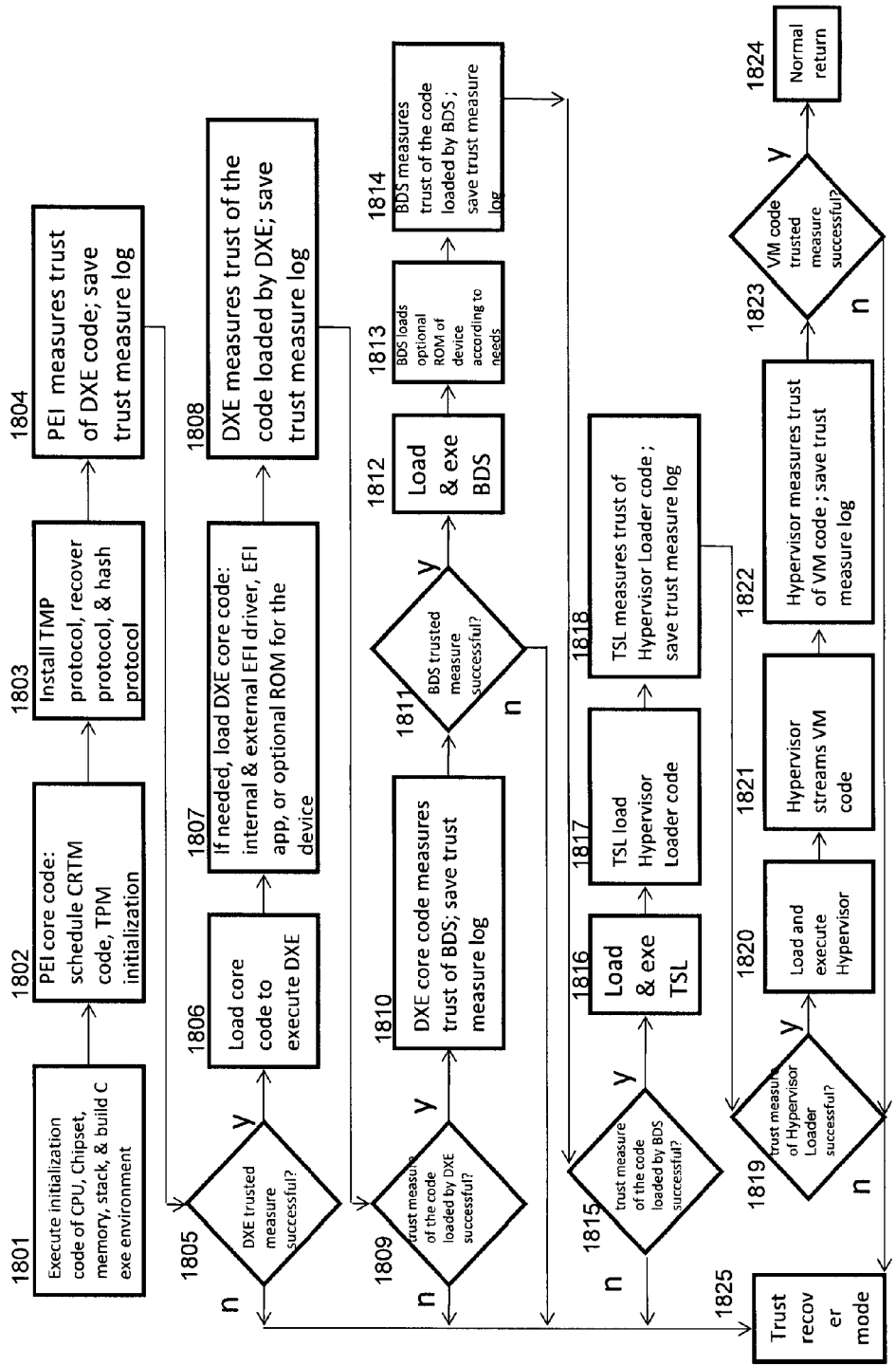
FIG. 18 is a flowchart of an embodiment based on this invention for eBag architecture "Link 1: the whole link control of OS startup", explaining Link 1 of FIG. 17.

Block 1723 describes the trust control base of eBag. The control base comprises the hardware of block 17231, the software of block 17232, and the network of block 17233. 17231 is actually an open hardware industrial standard (e.g. TCM or TPM). 17232 software further comprises application of block 172321 and OS of block 172322. Amongst these blocks, 4 security links are formed:

(1) Link 1: the total-lifecycle link control for OS startup due to hardware bootstrap (see FIG. 18)

Figure 19:
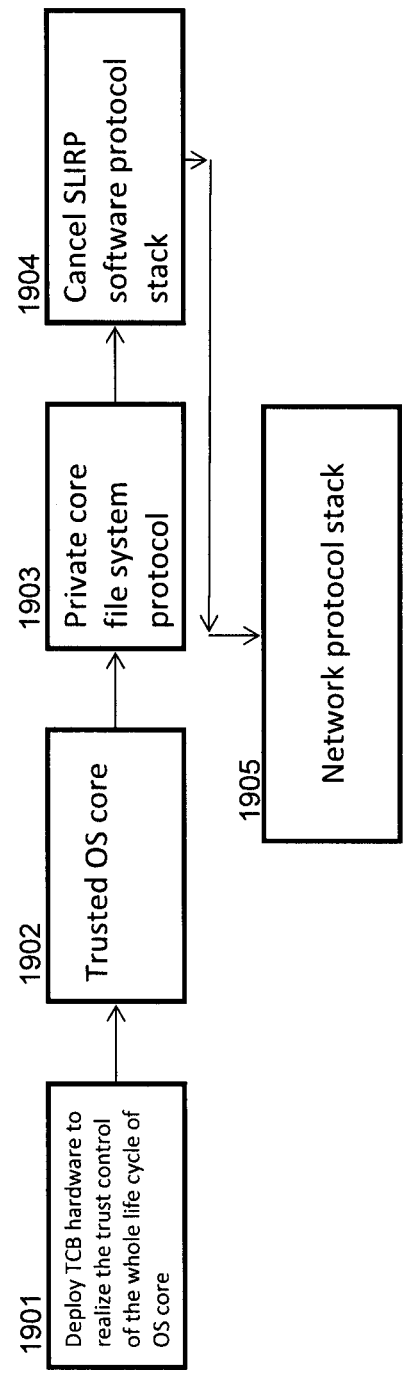
FIG. 19 is a flowchart of an embodiment based on this invention for eBag architecture "Link 2: the realization of closed OS", explaining Link 2 of FIG. 17.

(2) Link 2: the realization of closed OS (see FIG. 19)

Figure 20:
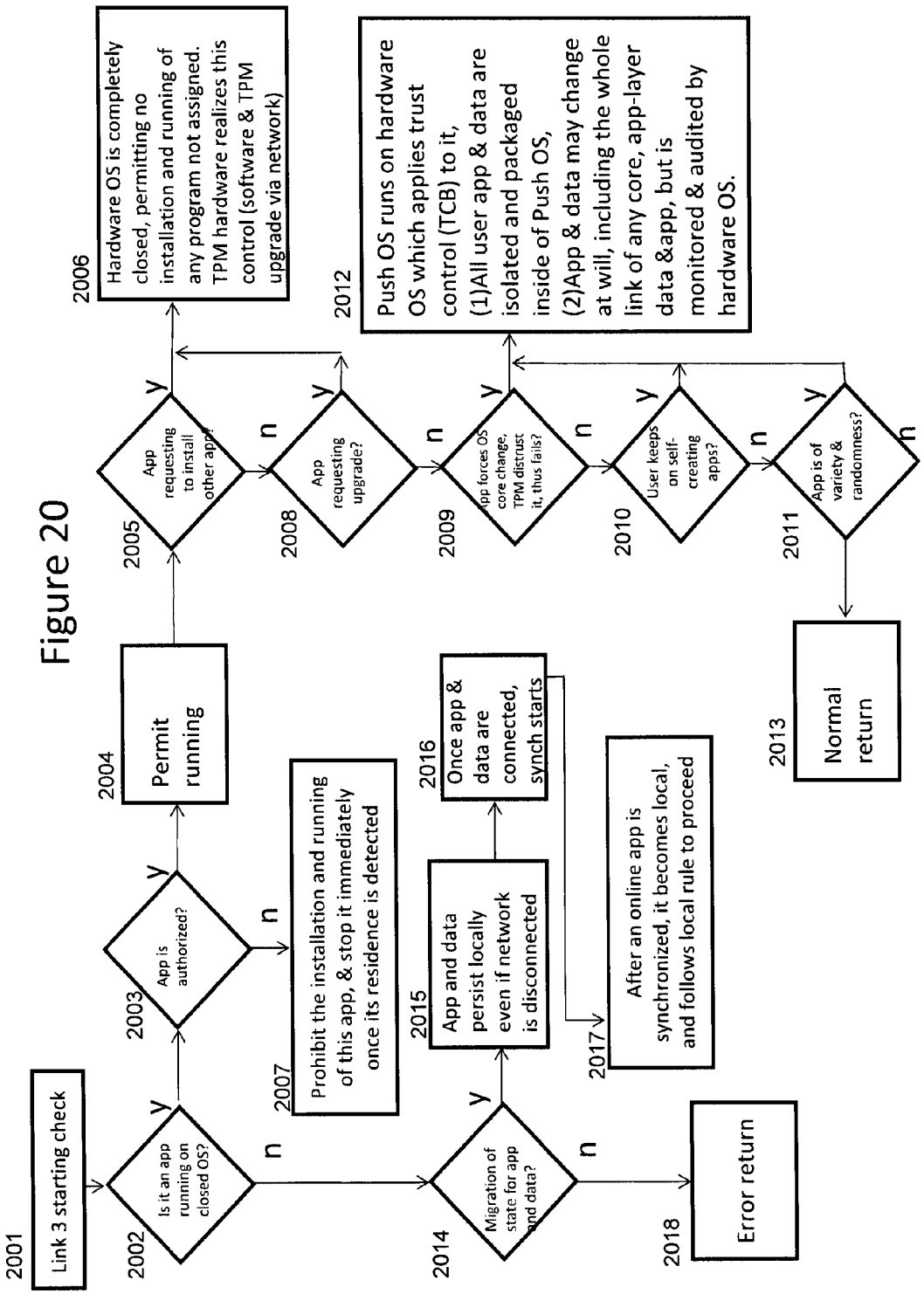
FIG. 20 is a flowchart of an embodiment based on this invention for eBag architecture "Link 3: the closed requirements of local application", explaining Link 3 of FIG. 17.

(3) Link 3: closed local computing requirement (see FIG. 20)

Figure 21:
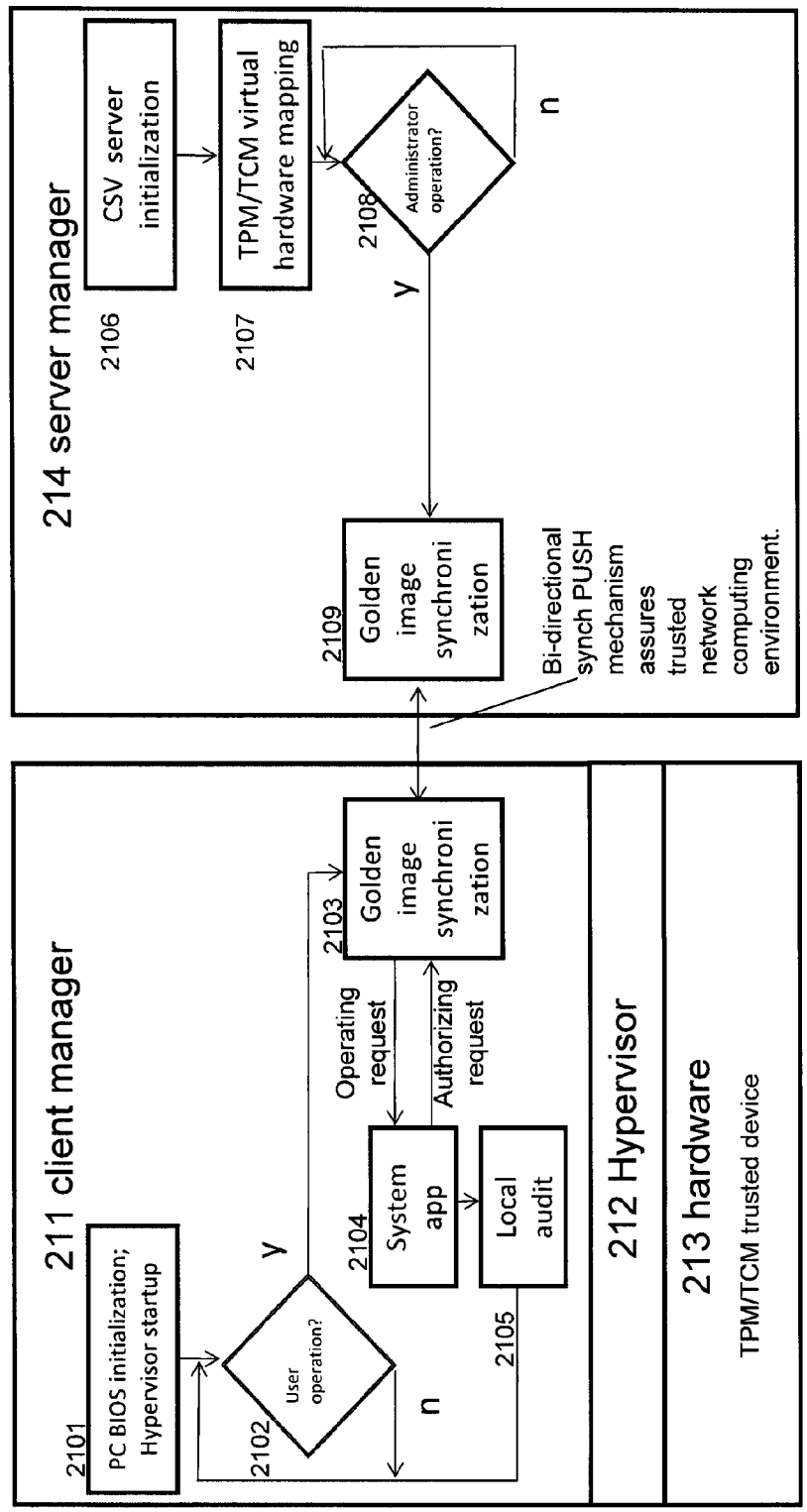
FIG. 21 is a flowchart of an embodiment based on this invention for eBag architecture "Link 4: hardware TPM trust link assures the security of network access", explaining Link 4 of FIG. 17.

(4) Link 4: hardware TPM/TCM trust link to assure the security of network access (see FIG. 21)

Further, here is the threat analysis to prevent hacker attacks described by client-side closed computing service:

(1) To the hardware of 17231, if a client connects to any other unauthorized disk, the OS kernel and MBR cannot be trusted by TPM/TCM, hence cannot operate.

(2) To the OS of 172322, if a client uses any other unauthorized OS, similarly, the OS kernel and MBR cannot be trusted by TPM/TCM, hence cannot operate.

(3) To the network of 17233, if a user connects to other computer via a network line, the connection fails since there is no SLIRP protocol.

(4) To the whole client trust computing base, if a user intends to use any other unauthorized hardware platform, e.g. uninstall the eBag hard disk and install it to other authorized machine, (4.1) then install other OS: although the installation cannot be stopped, TPM/TCM prohibits the eBag OS and the other OS to operate again on the eBag platform. (4.2) copy data to an eBag disk: although the copying cannot be stopped, the data copied cannot be analyzed or utilized due to its use of private file system protocol of eBag OS.

Link 1: The Total-Lifecycle Link Control for OS Startup

FIG. 18 illustrates the flowchart of link 1: the total-lifecycle of link control for OS startup. The embodiment is in conformance with the PC booting process of the international standard "Unified Extensible Firmware Interface (UEFI)", plus its secure trust measurements of the link control. UEFI has a total of 6 steps: the first step is SEC (Security), or security step; the second step is PEI (Pre-EFI-Initialization), or the initialization step before EFI; the third step is DXE (Driver Execution Environment), or the step to build execution environment for drivers; the fourth step is BDS (Boot Device Select), or the step to select boot device; the fifth step is TSL (Transient System Load), or the step to load transient system; the sixth step is RT (Run Time), or the step of runtime. Before the execution of most of the 6 steps, the loaded code must go through trust measure. Only if the trust measure is successful, can the next step be followed. This way guarantees the security of total-lifecycle link before OS startup. The workflow follows:

Step 1801, execute the initialization code of the CPU, Chipset, memory, and stack. Build C execution environment. Go to step 1802;

Step 1802, PEI core code: schedule CRTM code and initialize TPM. Go to step 1803;

Step 1803, install TMP protocol, recover protocol, & hash protocol. Go to step 1804;

Step 1804, PEI measures trust of DXE code and save trust measure log. Go to step 1805;

Step 1805, determine if the DXE trust measure is successful. If yes, go to step 1806. Otherwise, go to step 1825;

Step 1806, load the core code to execute DXE. Go to step 1807;

Step 1807, if needed, load DXE core code: internal & external EFI driver, EFI app, or optional ROM for the device. Go to step 1808;

Step 1808, DXE measures trust of the code loaded by DXE; save trust measure log. Go to step 1809;

Step 1809, determine if the loaded DXE code is successful in trust measure. If yes, go to step 1810. Otherwise, go to step 1825;

Step 1810, DXE core code measures trust of BDS; save trust measure log;

Step 1811, determine if the BDS trust measure is successful. If yes, go to step 1812. Otherwise, go to step 1825;

Step 1812, load & execute BDS. Go to step 1813;

Step 1813, BDS loads optional ROM of device according to needs. Go to step 1816;

Step 1814, BDS measures trust of the code loaded by BDS; save trust measure log. Go to step 1815;

Step 1815, determine if the code loaded by BDS is successful in trust measure. If yes, go to step 1816. Otherwise, go to step 1825;

Step 1816, load and execute TSL. Go to step 1802;

Step 1817, TSL loads hypervisor Loader code. Go to step 1818;

Step 1818, TSL trust measure hypervisor Loader code; save trust 保存 可 measure log. Go to step 1819;

Step 1819, determine if the hypervisor loader trust measure is successful. If yes, go to step 1820. Otherwise, go to step 1825;

Step 1820, load and execute hypervisor. Go to step 1821;

Step 1821, hypervisor streams VM code. Go to step 1822;

Step 1822, hypervisor measures trust of VM code; save trust measure log. Go to step 1823;

Step 1823, determine if the VM trust measure is successful. If yes, go to step 1824. Otherwise, go to step 1825;

Step 1824, return normally;

Step 1825, return with error.

Link 2: The Realization of Closed OS

FIG. 19 is the flowchart of link 2: the realization of closed OS. The embodiment is to realize closed OS in a total of 5 steps: the first step is to deploy TCB hardware to realize OS kernel total-lifecycle trust control; the second step is to posess trust OS kernel; the third step is to use private kernel file system protocol; the fourth step is to cancel SLIRP communication protocol stack used to connect to public net; and the fifth step is to use network protocol stack of bi-directional synchronization. The workflow comprises:

Step 1901, deploy TCB hardware to realize OS kernel total-lifecycle trust control. Go to step 1902;

Step 1902, posess trust OS kernel. Go to step 1903;

Step 1903, use the private kernel file system protocol. Go to step 1904;

Step 1904, cancel the SLIRP communication protocol stack. Go to step 1905;

Step 1905, use the network protocol-stack of bi-directional synchronization.

Link 3: Local Application Closed Requirement

FIG. 20 is the flowchart of link 3: local application closed requirement. The embodiment is about the security of application's total-lifecycle link in closed OS. The application must be authorized, but not permitted if this authorized application requests other application or itself to be upgraded. If a user attempt to vary OS kernel, TPM/TCM does not trust it to lead to an application failure; or the user continues to create applications; or the user runs multiple, random applications to be real-time trust-controlled due to the running of push-OS on the hardware-OS. Therefore:

(1) All user application and data are isolated and packaged into Push-OS, (2) Application and data may be varied in all links of kernel level or application level, or app-data level, but those links are supervised and audited by hardware-OS.

Further, regarding state migration of application and data, the application persists locally even if the client is disconnected from the network. On the other hand, once online, the synchronization starts. After the application is synchronized online, it can run locally according to local rules.

The Workflow is as Follows:

Step 2001, link 3 starts checking. Go to step 2002;

Step 2002, determine if it is an application to run specifically in the closed OS. If yes, go to step 2003. Otherwise, go to step 2014;

Step 2003, determine if the application is authorized. If yes, go to step 2004. Otherwise, go to step 2007;

Step 2004, the application is permitted to run. Go to step 2005;

Step 2005, determine if the application requests to install other application. If yes, go to step 2006. Otherwise, go to step 2008;

Step 2006, hardware OS is completely closed, permitting no installation and running of any program not assigned. TPM hardware realizes this control (software & TPM upgrade via network);

Step 2007, prohibit the installation and running of this app, & stop it immediately once its residence is detected;

Step 2008, determine if the application asks to upgrade. If yes, go to step 2006. Otherwise, go to step 2009;

Step 2009, determine if the application forces OS kernel to change changes so that TPM/TCM's distrust leads to application failure. If yes, go to step 2012. Otherwise, go to step 2010;

Step 2010, determine if the user continuously self-creates applications. If yes, go to step 2012. Otherwise, go to step 2011;

Step 2011, determine if the application is of variety & randomness. If yes, go to step 2012. Otherwise, go to step 2013;

Step 2012, push-OS runs on hardware OS which applies trust control (TCB) to it. Thus, (1) All user app & data are isolated and packaged inside of Push-OS, (2) App & data may change at will, including the total-lifecycle link of any core, app-layer data & application, but are monitored & audited by hardware OS;

Step 2013, return normally;

Step 2014, determine if it is the state migration of application and data. If yes, go to step 2015. Otherwise, go to step 2018;

Step 2015, application and data persist locally even after disconnected from the network. Go to step 2016;

Step 2016, perform synchronization once online. Go to step 2017;

Step 2017, the online application after synchronization enters into local client and operates according to local rules;

Step 2018, return with error.

Link 4: Hardware TPM Trust-Link Assuring the Security of Network Access

FIG. 21 is a combined block diagram and flowchart of link 4: hardware TPM trust-link assuring the security of network access. Block 211 is the client manager. Block 212 is hypervisor. Block 213 is hardware, especially those devices trusted by TPM/TCM, and becomes the base of the whole client-side closed computing service. Block 214 is server manager. The importance of the block is to map TPM/TCM virtual hardware at the server. On the other hand, from the diagram one can easily see that the PUSH mechanism of bi-directional synchronization assures the trust network computing environment.

The workflow of client manager 211 comprises:

Step 2101, PC BIOS initializes itself; hypervisor starts up. Go to step 2102;

Step 2102, determine if it is a user operation. If yes, go to step 2103. Otherwise, go to step 2102, go on to check if it is a user operation;

Step 2103, perform golden image synchronization with the sync component 2109 of the server. Bi-directional synch PUSH mechanism assures trusted network computing environment. Meanwhile, request the operation to system application. Go to step 2104;

Step 2104, run system application after authorized by server. Go to step 2106;

Step 2105, perform local audit. Go to step 2102;

The workflow of server manager 214 comprises:

Step 2106, CSV server initializes itself. Go to step 2107;

Step 2107, TPM/TCM virtual hardware mapping. Go to step 2108;

Step 2108, determine if it is an administrator operation. If yes, go to step 2109. Otherwise, go to step 2102, continue to check if it is an administrator operation;

Step 2109, perform golden image synchronization with the sync component 2103 of the client. Bi-directional synch PUSH mechanism assures trusted network computing environment.

Hypervisor for Hotelling-OS

Figure 22:
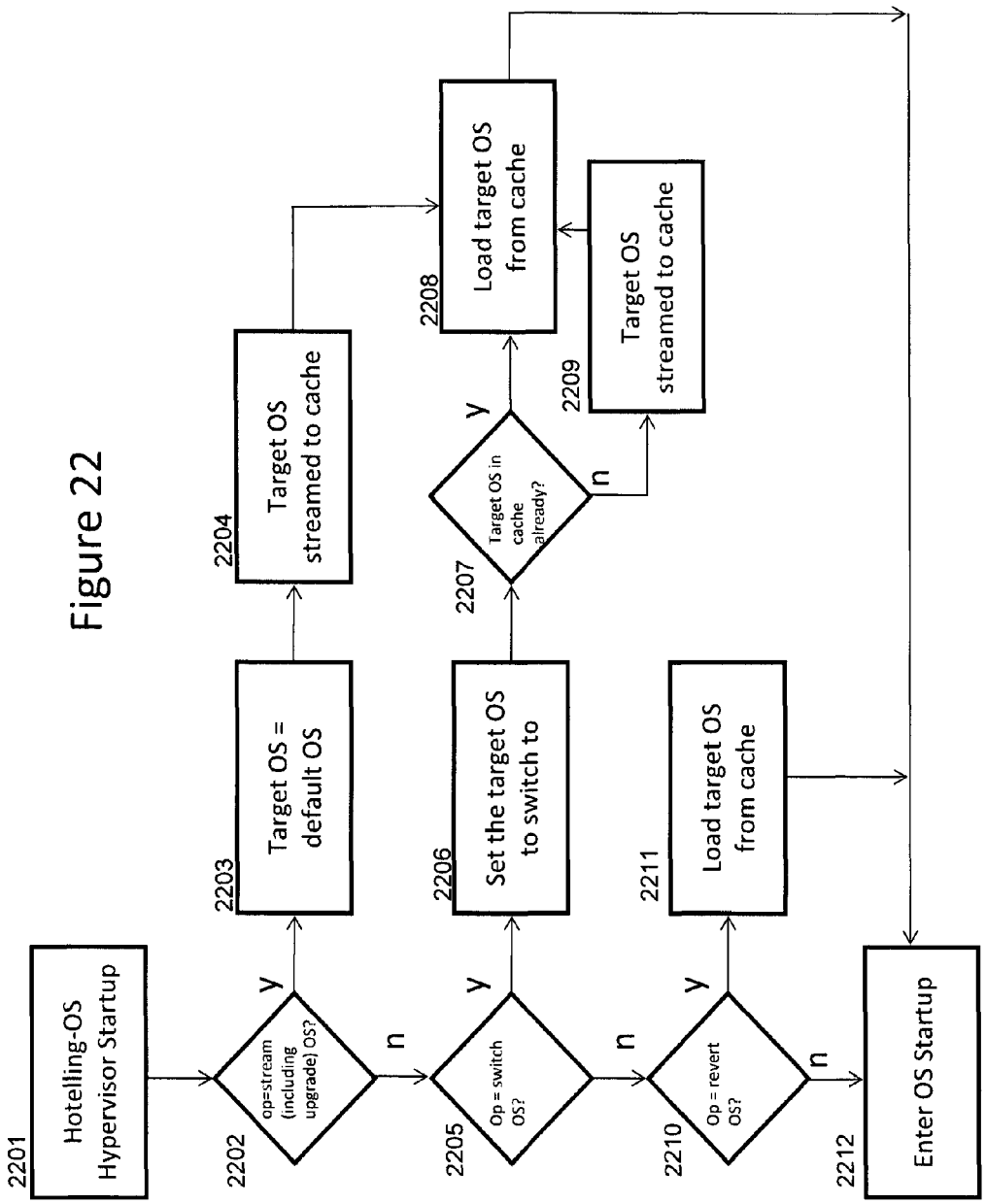
FIG. 22 is a flowchart of an embodiment based on this invention for CSV architecture "Hoteling hypervisor startup"

FIG. 22 is the flowchart for hotelling-OS hypervisor. Hotelling is a method of supporting unassigned seating in an office environment. Hotelling-OS is often required in cyber café or training center where the same OS needs reverting or different OS needs switching due to unassigned seating. The hypervisor of hotellin-OS manages the logic for these OSs, including OS reverting, switching and streaming. In a cyber café, reverting is needed since a new café customer taking the seat wants a clean OS. The customer may not need closed computing security since the customer may install or upgrade any new version of games. A training center classroom has similar reverting requirement. However, heavy-duty training organization also requires the client hardware loads different OS (e.g. XP, 2003, 2008, Vista, and Linux) when a different course starts. In the above two industry, a client may have cache, but the disk for cache may also be at the server room. The OS in the cache is the frequently-used OS.

The Workflow Comprises:

Step 2201, the hotelling-OS hypervisor starts up. Go to step 2202;

Step 2202, determine if the operation is streaming (includes upgrading) OS. If yes, go to step 2203. Otherwise, go to step 2205;

Step 2203, target OS=default OS. Go to step 2204;

Step 2204, target OS is streamed to cache. Go to step 2208;

Step 2205, determine if the operation is switching OS. If yes, go to step 2206. Otherwise, go to step 2210;

Step 2206, set the target OS to switch to. Go to step 2207;

Step 2207, determine if the target OS is in cache already. If yes, go to step 2208. Otherwise, go to step 2209;

Step 2208, load target OS from cache. Go to step 2212;

Step 2209, target OS is streamed to cache. Go to step 2208;

Step 2210, determine if the operation is reverting OS. If yes, go to step 2211. Otherwise, go to step 2212;

Step 2211, load target OS from cache. Go to step 2212;

Step 2212, enter OS startup.

Synchronization Between Local Disk and Distributed File System

Figure 23:
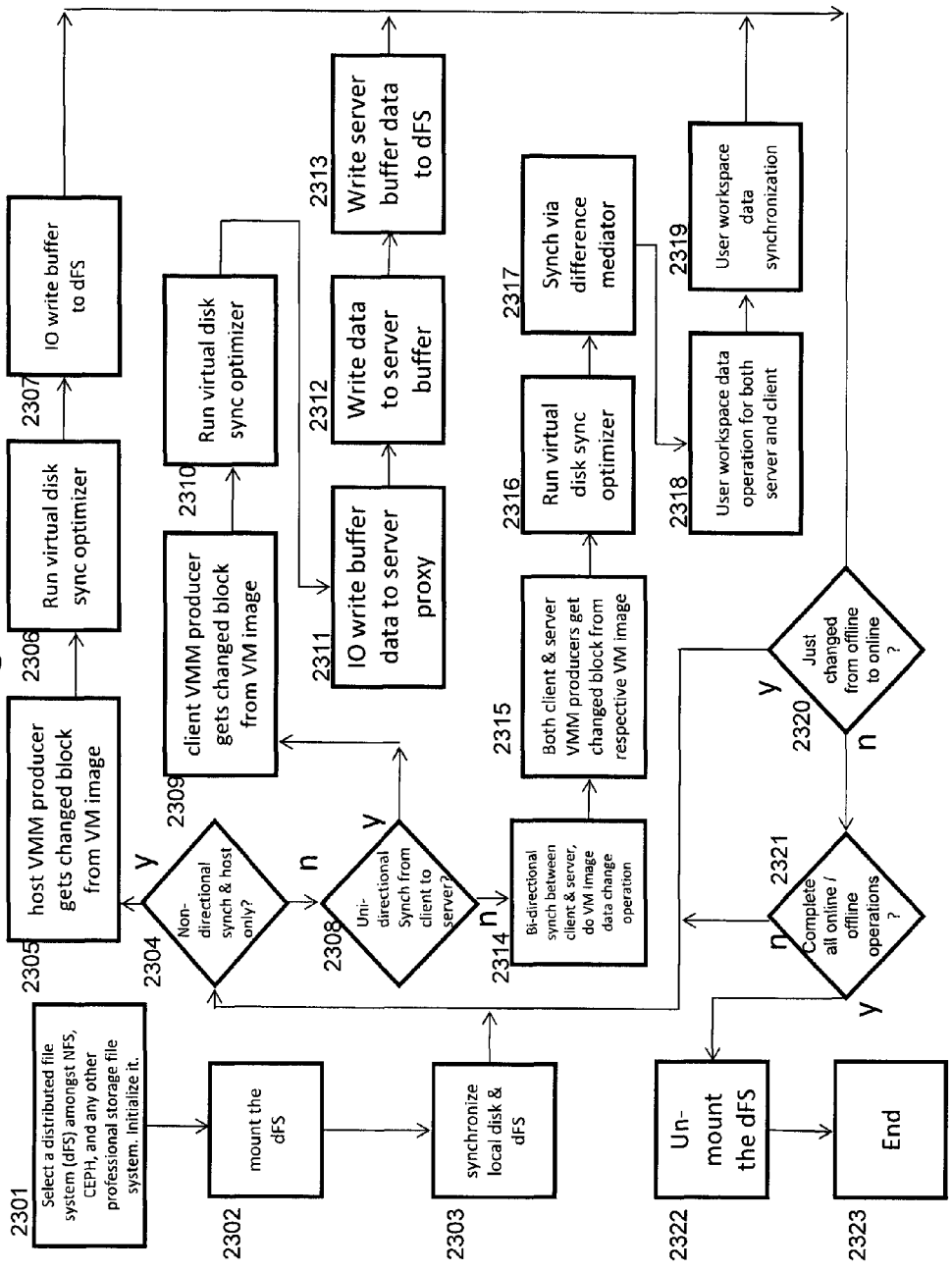
FIG. 23 is a flowchart of an embodiment to illustrate "Synchronization between local disk and distributed file system", explaining step 0923 of FIG. 9.

FIG. 23 is the flowchart for synchronization between local disk and distributed file system (dFS), explaining step 0923 of FIG. 9. The dFS can be NFS, CEPH or any other professional storage file system. There are three configurations:

(a) The non-directional synchronization, where client and server are in the same host (e.g. VDI). The data in virtual disk is synchronized to a mounted dFS via virtual disk sync optimizer;

(b) The uni-directional synchronization, where only the client change is synchronized to the server. The data is first written to the proxy then to the dFS via virtual disk sync optimizer; and (c) The bi-directional synchronization, where via a mediator client and server, changes are synchronized to each other's virtual disk via virtual disk sync optimizer and difference mediator. In addition, user workspace data is synchronized too.

As described, the disk operation is done via a loosely-coupled dFS. The patent U.S. Pat. No. 7,447,854B1 to Cannon, et al. uses virtual disk with a tightly-coupled VMWare file system under VMM environment for block-level synchronization. While both methods use synchronization algorithm of open knowledge such as open-source rsync or unisom, the loosely-coupled dFS disclosed in our invention has the advantage of easy-adaptness to NFS, CEPH, and/or other professional storage file systems. The synchronization between local and dFS also suits for three different cases: no directional, uni-directional and bi-directional synchronization while Cannon does not make such distinctions. Besides, because of the tightly-coupled nature, Cannon does not recover local data in case of network disconnection. Local data can be recovered with mapped metadata and algorithm shown in steps 2415 to 2419 of FIG. 24.

The Workflow Comprises:

Step 2301, select a distributed file system (dFS) amongst NFS, CEPH, and any other professional storage file system. Initialize it. Go to step 2302;

Step 2302, mount the dFS. Go to step 2303;

Step 2303, synchronize local disk & dFS. Go to step 2304;

Step 2304, determine if non-directional synch & host only. If yes, go to step 2305. Otherwise, go to step 2308;

Step 2305, host VMM producer gets changed block from VM image. Go to step 2306;

Step 2306, run virtual disk sync optimizer. Go to step 2307;

Step 2307, IO write buffer to dFS. Go to step 2320;

Step 2308, determine if uni-directional synch from client to server. If yes, go to step 2309. Otherwise, go to step 2314;

Step 2309, client VMM producer gets changed block from VM image. Go to step 2310;

Step 2310, run virtual disk sync optimizer. Go to step 2311;

Step 2311, perform an IO-write of buffer data to a server proxy. Go to step 2312;

Step 2312, write the data to server buffer. Go to step 2313;

Step 2313, write the server buffer data to dFS. Go to step 2320;

Step 2314, bi-directional synch between client & server, do VM Image data change operation. Go to step 2315;

Step 2315, both client & server VMM producers get changed block from respective VM image. Go to step 2316;

Step 2316, run virtual disk sync optimizer. Go to step 2317;

Step 2317, synch via difference mediator. Go to step 2318;

Step 2318, perform user workspace data operation for both server and client. Go to step 2319;

Step 2318, perform user workspace data synchronization. Go to step 2319;

Step 2320, determine if just changed from offline to online. If yes, go to step 2304. Otherwise, go to step 2321;

Step 2321, determine if completed all online/offline operations. If yes, go to step 2322. Otherwise, go to step 2304;

Step 2322, unmount the dFS. Go to step 2323;

Step 2323, come to the end.

Virtual Disk (VD) Synchronization Optimizer

Figure 24:
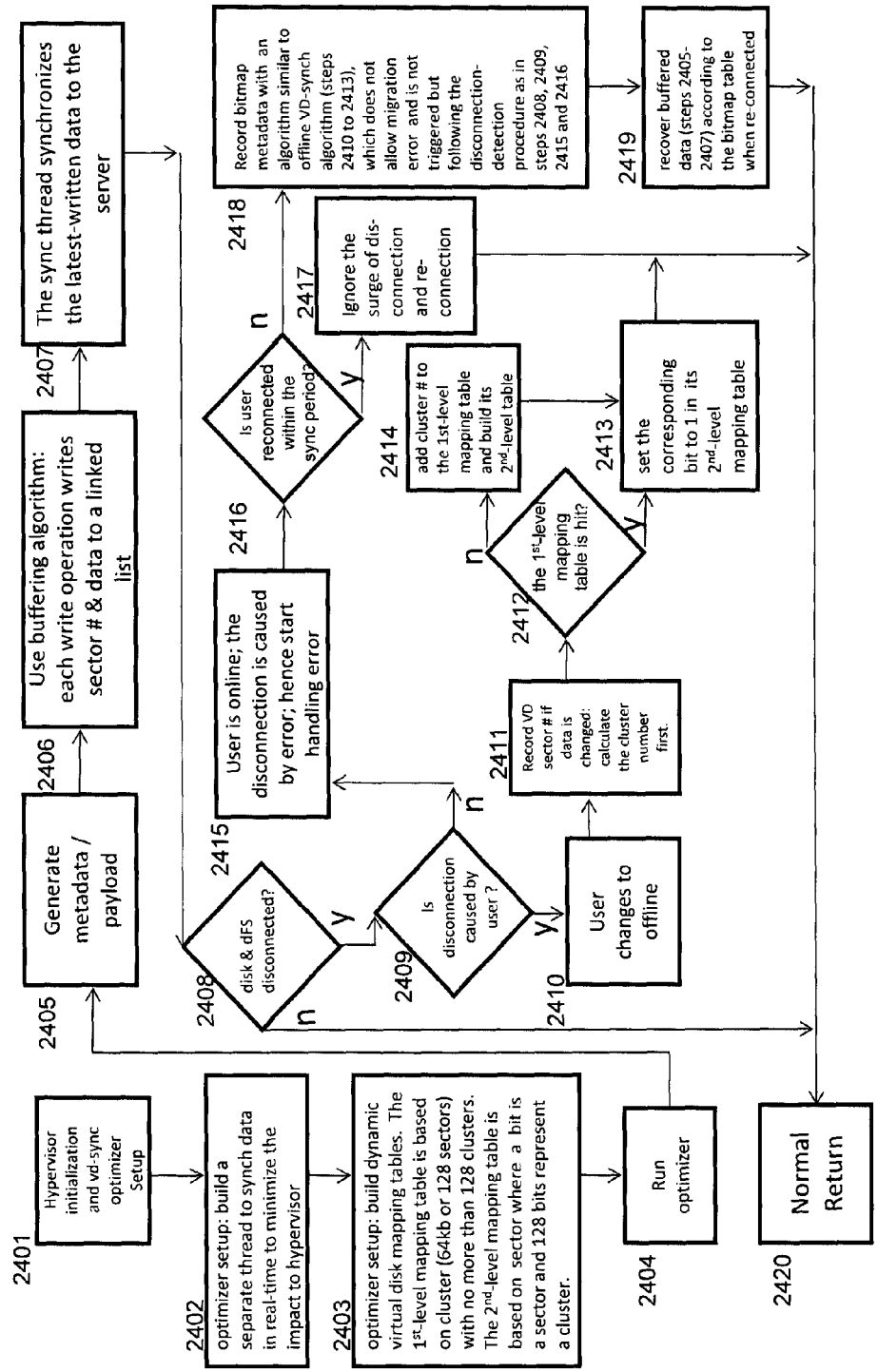
FIG. 24 is a flowchart of an embodiment to illustrate "virtual disk (VD) synchronization optimizer", explaining steps 2306, 2310, and 2316 of FIG. 23.

FIG. 24 is the flowchart for virtual disk (VD) synchronization optimizer, explaining steps 2306, 2310, and 2316 of FIG. 23. During hypervisor initialization, the optimizer builds (a) a separate thread to synch data in real-time to minimize the impact to hypervisor, and (b) dynamic virtual disk mapping tables. The $1^{st}$-level mapping table is based on disk cluster (64 kb or 128 sectors) with no more than 128 clusters. The $2^{nd}$-level mapping table is based on sector where a bit represents a sector and 128 bits represent a disk cluster. During runtime, the optimizer performs two operations:

(a) Normal operation during online and offline;
  1. The online operation uses buffering algorithm: each write operation writes sector # & data to a linked list. A sync thread synchronizes the latest-written data to the server; and
  2. The offline operation records VD sector number if data is changed, and calculate the cluster number first. The $1^{st}$-level mapping table is hit, set the corresponding bit to 1 in its $2^{nd}$-level mapping table. If not, add cluster number to the 1st-level mapping table and build $2^{nd}$-level table.

(b) The recovery operation caused by an erroneous line disconnection between client and server. The recovery utilizes recorded bitmap metadata with an algorithm similar to offline VD-synch algorithm, which does not allow migration error and is not triggered but following a disconnection-detection procedure.

The Workflow Comprises:

Step 2401, perform hypervisor initialization and vd-sync optimizer Setup. Go to step 2402;

Step 2402, perform optimizer setup: build a separate thread to synch data in real-time to minimize the impact to hypervisor. Go to step 2403;

Step 2403, perform optimizer setup: build dynamic virtual disk mapping tables. The $1^{st}$-level mapping table is based on cluster (64 kb or 128 sectors) with no more than 128 clusters. The $2^{nd}$-level mapping table is based on sector where a bit represents a sector and 128 bits represent a cluster. Go to step 2404;

Step 2404, run optimizer. Go to step 2408;

Step 2405, generate metadata/payload. Go to step 2406;

Step 2406, use buffering algorithm: each write operation writes sector # & data to a linked list. Go to step 2407;

Step 2407, the sync thread synchronizes the latest-written data to the server. Go to step 2408;

Step 2408, determine if disk & dFS disconnected. If yes, go to step 2409. Otherwise, go to step 2420;

Step 2409, determine if disconnection caused by user. If yes, go to step 2410. Otherwise, go to step 2415;

Step 2410, change from online to offline. Go to step 2411;

Step 2411, record VD sector # if data is changed: calculate the cluster number first. Go to step 2412;

Step 2412, determine if the $1^{st}$-level mapping table is hit. If yes, go to step 2413. Otherwise, go to step 2414;

Step 2413, set the corresponding bit to 1 in its $2^{nd}$-level mapping table. Go to step 2420;

Step 2414, add cluster # to the 1st-level mapping table and build the $2^{nd}$-level table corresponding to the cluster. Go to step 2413;

Step 2415, User is online; the disconnection is caused by error; hence start handling error. Go to step 2416;

Step 2416, determine if user reconnected within the sync period. If yes, go to step 2417. Otherwise, go to step 2418;

Step 2417, ignore the surge of dis-connection and re-connection. Go to step 2420;

Step 2418, record the bitmap metadata with an algorithm similar to offline VD-synch algorithm (steps 2410 to 2413), which does not allow migration error and is not triggered but following the disconnection-detection procedure as in steps 2408, 2409, 2415 and 2416. Go to step 2419;

Step 2419, recover buffered data (steps 2405-2407) according to the bitmap table when re-connected. Go to step 2420;

Step 2420, return normally.

In an actual deployment environment, the techniques of synchronization, streaming, closed computing service and other methods of the invention are completely independent of client hardware model, VMM type, and guest OS type. Therefore, the disclosed method can be adjusted to fit any client such as desktop, laptop, netbook, removable storage, and other mobile devices, including smart phone; the VMM may be any commercial hypervisor, including TRANSOFT TVM, CITRIX XEN, VMWARE WORKSTATION, etc; the guest OS may be Windows, Linux, Android, and other cellphone VM. Further, the applied business lines are not limited to those described in this patent such as school, office, cyber café, and training classroom. Lastly, the disclosed CSV method may also cover X86 hardware virtualization technology beyond Intel and AMD, as well as any non-X86 hardware architecture.

From the above workflow descriptions, we conclude the following: the method of CSV on one hand provides for enterprises the technology of CSV, which is based on bi-directional synchronization and closed computing to build CSV architecture, such that IT administrators of different departments may manage respective layer of images at the server: user application data, user system data, cache, individual application, organizational application, VM, and VMM. On the other hand, due to the synchronized nature and secured nature of the system, a user during offline is able to access his personal network (e.g. home LAN), or take advantage of hotelling hypervisor to launch VM, such that the client-side hardware may be used by multiple persons at different time frames.

In summary, the invention combines client-side virtualization functions and server-side counterpart functions to do synchronization and closed computing secured service for various lines of businesses. The CSV architecture of this invention also provides a method based on client/server architecture, such that an online user gets synchronized data, application and OS from the server. Further, the user OS is strictly protected from hacker attacks. The system, as an extension of VDI technology, may be applied to several business lines such as: the eSchoolbag of education community, the eBriefcase of enterprises and government agencies, the invertable desktop of cyber café, and the student workstation to switch to different OSs of a training center.

The above embodiments enable those skilled in the art to realize or utilize the invention. Those skilled in the art may make various modifications to the invention as long as the modification is within the bounds of the inventive ideas. Therefore the protection range of the invention is not limited to the above embodiments. Rather, it should have the largest protection range described by the technical characteristics of the claims.

The invention claimed is:

1. A Client-Side Virtualization (CSV) architecture for implementing a method of client-side virtualization using differential synchronization and closed computing, wherein the CSV architecture can be one of an architecture for a service consumer or a service provider, the CSV architecture comprising:

a virtual desktop infrastructure (VDI) server;

a virtual mobile infrastructure (VMI) server;

a CSV client, configured to save user data, an application image, a virtual machine (VM), and a virtual machine monitor (VMM), wherein the CSV client includes:

a client hardware, configured to implement a BIOS initialization process; a client manager, configured to use bi-directional image synchronization to synchronize image between the CSV client and a CSV server; and a VDI/VMI client, configured to interact with the VDI/VMI server via a remote desktop protocol;

the CSV server, comprising a server manager, server virtualization components, server hardware and server storage devices, wherein the server storage devices are configured to save user data, an application image, a VM image, and a VMM binary code;

wherein the CSV client and the CSV server use a layered architecture, both the CSV client and the CSV server further including: user application data and system data, a user application, a company application, an operating system, a repository system, a cache system, and a network connection;

wherein the BIOS initialization process of the CSV client comprises:
during BIOS initialization, writing the VMM binary code to a loadable area;
after the BIOS initialization is completed, starting the VMM;
using the VMM to upgrade, reset, and switch a guest OS, download the VM image from the CSV server, and upload the VM image to the CSV server for synchronization purpose; and
using the VMM to revert guest OS of a client VM, and switch guest OS amongst multiple OS candidates;

wherein the bi-directional image synchronization further comprises:
forming the application image by image decomposition, and forming the operating system image by image composition;
after a user session for a user associated with the CSV client starts, if the CSV client for the user is offline, then the CSV client gets a read-only golden image and starts creating an image differential, and if the CSV client for the user is online, resources are read/written with the image differential using a differential algorithm; and
the bi-directional image synchronization uses a streaming protocol;

wherein forming the application image by image decomposition includes creating a compressed file of differentials which includes detected system information but excludes the golden image;

wherein forming the operating system image by image composition includes:
decompressing the compressed file resulting from image decomposition, and then adding other detected system information and other files, excluding the golden image, into the golden image of the client VM;
if the user of the CSV client belongs to a same user group, the client VM uses an upcall and a broadcast function at a server-side VMM to perform image composition; and
during image composition, if the server-side VMM supports Linux and a guest OS is Windows, the procedures to handle Windows virtual application image are: first transform a read/write of composed file into the read/write of disk sector, then transform the read/write of disk sector into read/write of a Linux qcow2 file.

2. The CSV architecture of claim 1 wherein the repository system is configured to place user system files in a synchronization area with a redirection technique; backup the user system files, except for temporary files, at the CSV server with the bi-directional image synchronization using the streaming protocol;
the repository system reads data with a cache pre-fetch mechanism, builds a different privilege for a different network channel at different mount point when writing data, provides a TCP connector with a different privilege from a mounted NFS server or distributed file system server.

3. The CSV architecture of claim 1 wherein the cache system is configured to:
use a cache pre-fetch mechanism to set a priority of file blocks according to an access rate, so that important data may be pre-fetched;
if a latency percentage is more than a preset threshold, reduce a request rate;
if the latency percentage is less than the preset threshold, increase the request rate; and
if the latency percentage is equal to the preset threshold, increase or reduce request rate by a fixed amount depending on the latency of previous request.

4. The CSV architecture of claim 1 wherein the differential algorithm further comprises:
for a file block changed at the CSV client or the CSV server, calculating its hash value, and writing to metadata the file block identifier, the file this block belongs to, and whether the file is user application, user system data, or the image composed of the application and the operating system;
for a file block changed at the CSV client, when its hash value and metadata are sent to the CSV server, comparing the hash value and the metadata with the server-side hash value and metadata of the corresponding file block, then a difference mediator is performed and a snapshot is taken.

5. The CSV architecture of claim 4 wherein the difference mediator further comprises:
comparing each of the hash values of the changed file block at the CSV server and the hash value of changed file block at the CSV client, with the hash value of the latest snapshot of corresponding file block;
if the hash value of file block at the CSV server is different from the hash value of the file block of the snapshot, but the hash value of file block at the CSV client is the same as the hash value of the file block of the snapshot, then sending the file block at the CSV server to CSV client; after the file block is received at the CSV client, replacing the corresponding file block at the CSV client with the received file block;
if the hash value of the file block at CSV client is different from the hash value of the file block of the snapshot, but the hash value of file block at the CSV server is the same as the hash value of the file block of the snapshot, requesting at the CSV server, the file block from the CSV client; after the file block of the CSV client is received at the CSV server, replacing the corresponding file block at the CSV server with the received file block;
if the hash value of file block at the CSV client is different from the hash value of the file block of the snapshot, and the hash value of file block at the CSV server is also different from the hash value of the file block of the snapshot, performing a merge operation; after the merge operation, replacing both of the file blocks at the CSV client and at the CSV server by the file block resulted from the merge operation.

6. The CSV architecture of claim 5, wherein the merge operation further comprises:
if the changed file block belongs to a text file, marking a changed portion, displaying a change operation and merging the change; if the changed file block belongs to a non-text file, using a predefined policy to perform overwrite.

7. The CSV architecture of claim 1 wherein the streaming protocol further comprises:
if the CSV server requests a file block from the CSV client, and the file block already exists in the cache system via the comparison of the metadata of the file block, then sending the file block in the cache system to the CSV server immediately;
if the CSV client is a removable storage, then acquiring via streaming, at the removable storage, the VMM and the golden image at the CSV client, then starting up at a third-party computer, a mobile storage and performing an offline operation.

8. An eBag, comprising a Client-Side Virtualization (CSV) client and a CSV server, wherein, the CSV server functions as an intermediary, connecting with the CSV client via fixed network or mobile network at one end, and connecting with a upper-level server via wide-area communication at the other end;

the CSV server functions as a push-OS server, comprising resource aggregation applications;

the CSV client functions as a push-OS client, comprising online and offline resource migration and state switch of network access;

the CSV client configured to save user data, an application image, a virtual machine (VM), and a virtual machine monitor (VMM), the CSV client including a client hardware and a client manager, configured to use bi-directional image synchronization to synchronize image between the CSV client and the CSV server; and a virtual desktop infrastructure (VDI)/virtual mobile infrastructure (VMI) client, configured to interact with a VDI/VMI server via a remote desktop protocol;

the CSV server, including a server manager, server virtualization components, server hardware and server storage devices, wherein the server storage devices are configured to save user data, an application image, a VM image, and VMM binary code;

wherein state of the push-OS client comprises, an offline state of one of the following devices:

a client device able to go offline with CPU, prohibiting unauthorized application via closed computing during offline, and prohibiting access to any website except authorized ones by network resource control service; or an offline-only OS storage device without CPU, prohibiting unauthorized application via closed computing, and prohibiting access to any website except authorized websites by network resource control service after connecting to a third-party device; and an online state of one of the following devices:

an online-only client device without storage, online operating a virtual desktop which displays the screen of a server VM; or a client device able to go offline with CPU, synchronizing VM differential to CSV server; or an offline-only, no-CPU removable storage, synchronizing VM differential to online device and to the CSV server;

wherein the closed computing comprises a client trust computing base, including the following security links: (1) a total-lifecycle link control from Hardware bootstrapping to OS startup; (2) a closed-OS; (3) a local closed computing; (4) a Trust Platform Module (TPM)/Trust Computing Module (TCM) trust link to guarantee the security of network access; and (5) an application/data control link;

wherein the total-lifecycle link control comprises an EBag trust computing OS; an EBag trust computing hardware platform; and a PCR trust link, including: (1) IPL/MBR—kernel hash; (2) BIOS—IPL/MBR hash; and (3) CRTM—BIOS hash.

9. The eBag of claim 8, wherein the push-OS server performs:

update and cleanup of data, application, and resource;

real-time audit and non-real-time audit of data, application, and resource;

network resource control; and personal gateway access and VM subscription management control.

10. The eBag of claim 9 wherein the VM subscription management control validates user subscription record via personnel and VM databases when client requests an access.

11. The eBag of claim 9, wherein the VM subscription management control further comprises:

the CSV client is permitted to access the CSV server, wherein a resource management control authenticates the CSV client using resource index table via a resource policy manager;

wherein the resource index table comprises authorized URL and authorized resource index under a RESTful client-server architecture.

12. The eBag of claim 8 wherein the closed-OS further comprises:

deployment of TCB hardware to realize trust control of a total-lifecycle of OS core;

a trust OS core;

a private core file system protocol;

cancellation of SLIRP communication protocol stack; and a network protocol stack.

13. The eBag of claim 8 wherein the local closed computing further comprises following behavior of an application when guest OS is running in a closed environment:

if the application is not authorized, prohibit an installation and running of the application;

if the application is authorized, carry out the following control:

(1) TPM/TCM carries out the an upgrade or installation of other applications requested by the application; and (2) push-OS is running on hardware operating system wherein trust control is carried out if the application tries to change kernel of OS.

14. The eBag of claim 8 wherein the TPM/TCM trust link to guarantee the security of network access further comprises:

a trust device of client-side TPM/TCM;

a virtual hardware mapping device of server-side TPM/TCM; and a bi-directional push mechanism.

\* \* \* \* \*